(12) United States Patent
Yamamoto et al.

(10) Patent No.: US 9,997,929 B2
(45) Date of Patent: Jun. 12, 2018

(54) FOREIGN OBJECT DETECTING DEVICE, WIRELESS POWER TRANSMITTING APPARATUS, AND WIRELESS POWER TRANSFER SYSTEM

(71) Applicant: Panasonic Intellectual Property Management Co., Ltd., Osaka (JP)

(72) Inventors: Atsushi Yamamoto, Kyoto (JP); Hiroshi Kanno, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 156 days.

(21) Appl. No.: 15/065,931

(22) Filed: Mar. 10, 2016

(65) Prior Publication Data

US 2016/0336759 A1    Nov. 17, 2016

(30) Foreign Application Priority Data

May 15, 2015  (JP) .................................. 2015-100049

(51) Int. Cl.
*H02J 5/00*    (2016.01)
*H02J 50/60*   (2016.01)
*G01V 3/10*    (2006.01)

(52) U.S. Cl.
CPC ............ *H02J 5/005* (2013.01); *G01V 3/101* (2013.01); *H02J 50/60* (2016.02)

(58) Field of Classification Search
CPC ............ H02J 5/005; H02J 50/60; H02J 50/12; G01V 3/101

(Continued)

(56) References Cited

U.S. PATENT DOCUMENTS 9,476,736 B2 * 10/2016 Arisawa ................ G01D 5/2006
9,728,982 B2 *  8/2017 Yamamoto ............ G01V 3/10
(Continued)

FOREIGN PATENT DOCUMENTS

DE    202009009693 U1   12/2010
JP    2007-074334        3/2007
(Continued)

OTHER PUBLICATIONS

Communication pursuant to Article 94(3) EPC, dated Oct. 20, 2017, for the related European Patent Application No. 16158972.6.

*Primary Examiner* — Dinh T Le
(74) *Attorney, Agent, or Firm* — Greenblum & Bernstein, P.L.C.

(57) ABSTRACT

A foreign object detecting device includes first, second, and third coils and a foreign object detecting circuit. The foreign object detecting circuit outputs a first detecting signal having a first predetermined waveform to a first terminal of the first coil and outputs a second detecting signal having a second predetermined waveform, which is an inverted form of the first predetermined waveform, to a fifth terminal of the third coil to cause a combined magnetic field extending over the first and third coils. The foreign object detecting circuit measures an amount of change of the impedance value of the first or third coil with respect to a change in the combined magnetic field in the case of the presence of a foreign object. The amount of change exceeds a predetermined value, the foreign object detecting circuit determines that there is a foreign object above the second coil.

20 Claims, 24 Drawing Sheets

(58) Field of Classification Search
USPC .................................. 307/104; 320/108, 137
See application file for complete search history.

(56) References Cited

U.S. PATENT DOCUMENTS

| | | |
|---|---|---|
| 2009/0026844 A1 | 1/2009 | Iisaka et al. |
| 2013/0038281 A1 | 2/2013 | Sakakibara et al. |
| 2013/0241302 A1 | 9/2013 | Miyamoto et al. |
| 2013/0307346 A1* | 11/2013 | Arisawa .................. H01F 38/14 |
| | | 307/104 |

FOREIGN PATENT DOCUMENTS

| | | |
|---|---|---|
| JP | 2009-033782 | 2/2009 |
| JP | 4525710 B2 | 8/2010 |
| JP | 4780447 B2 | 9/2011 |
| JP | 2011-234496 | 11/2011 |

* cited by examiner

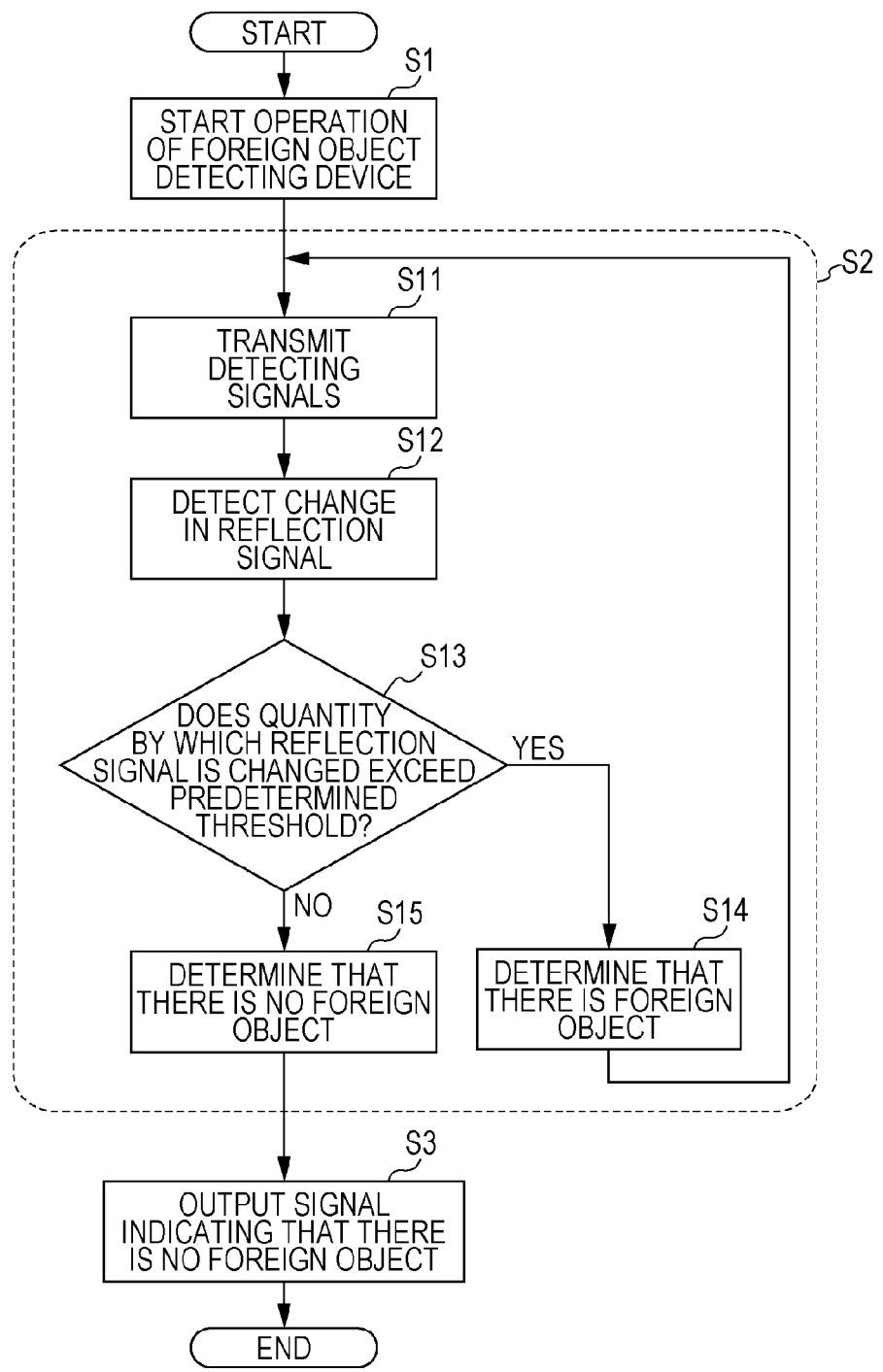

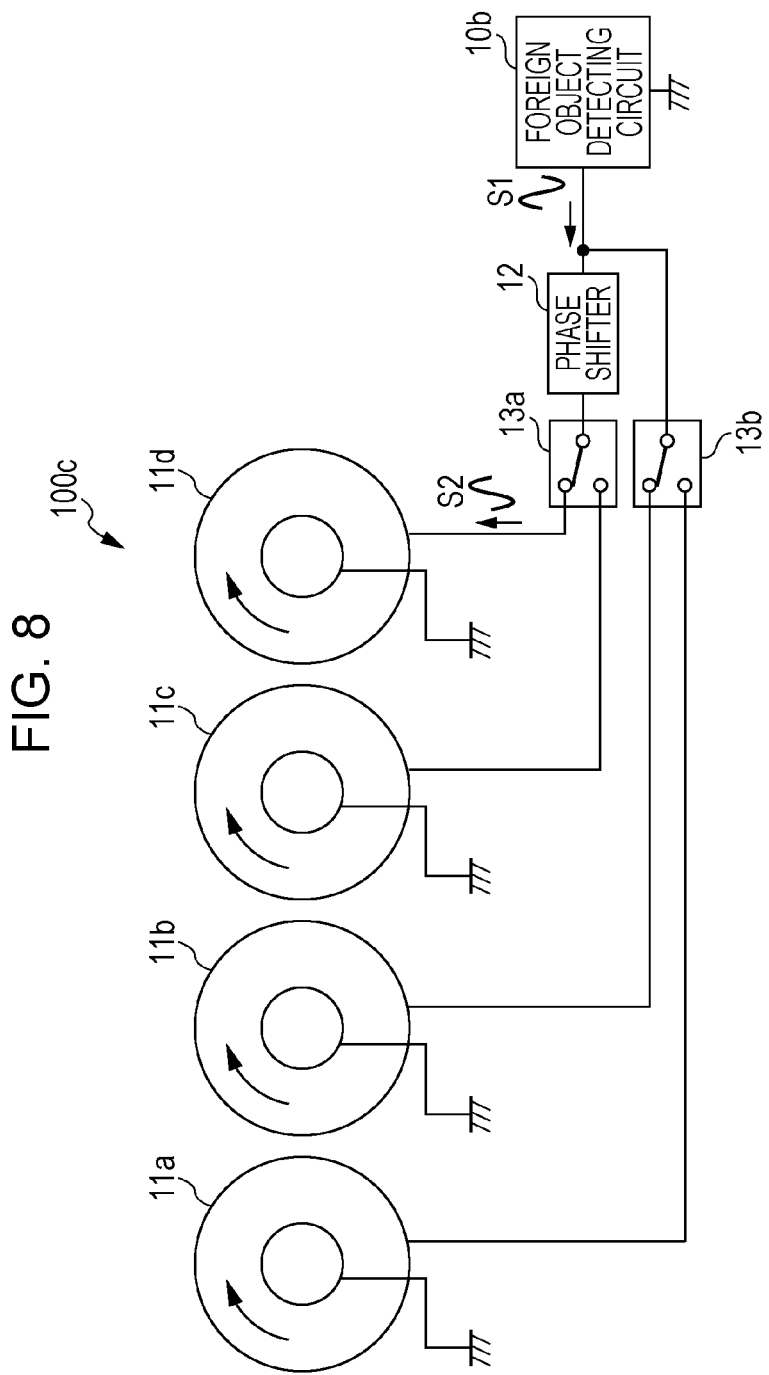

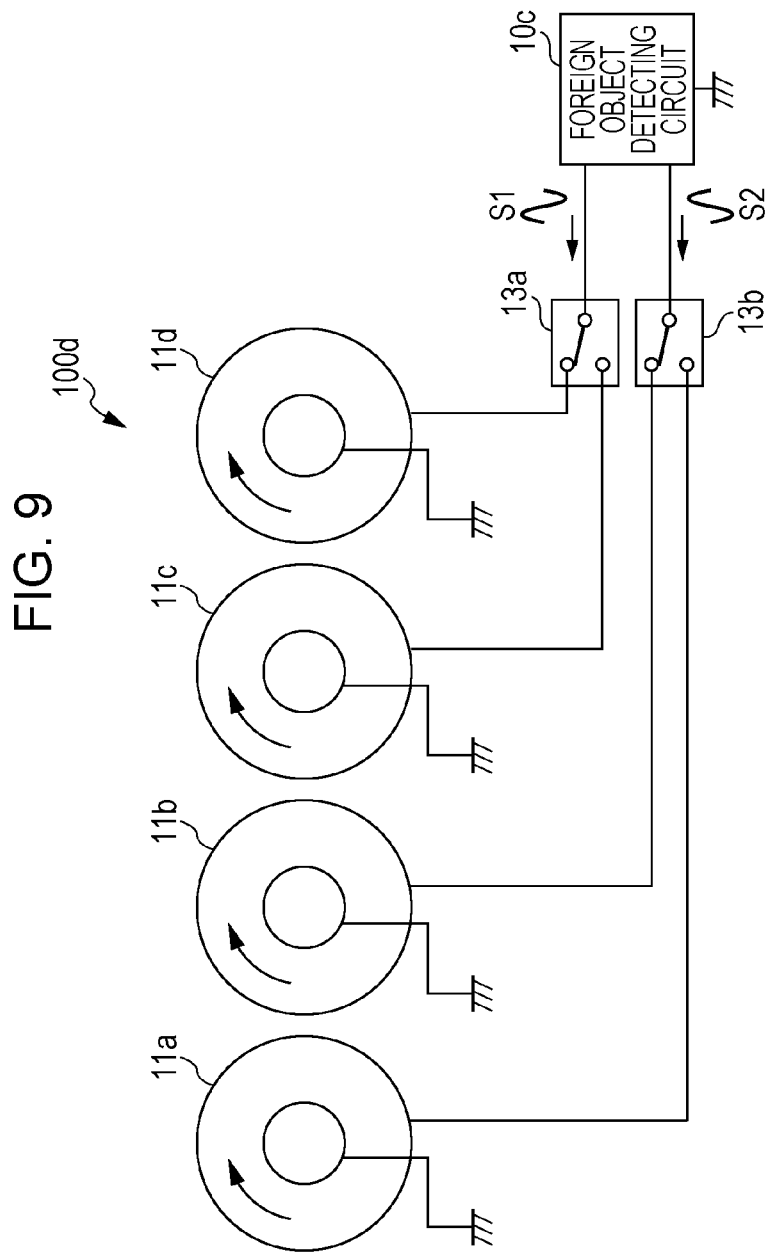

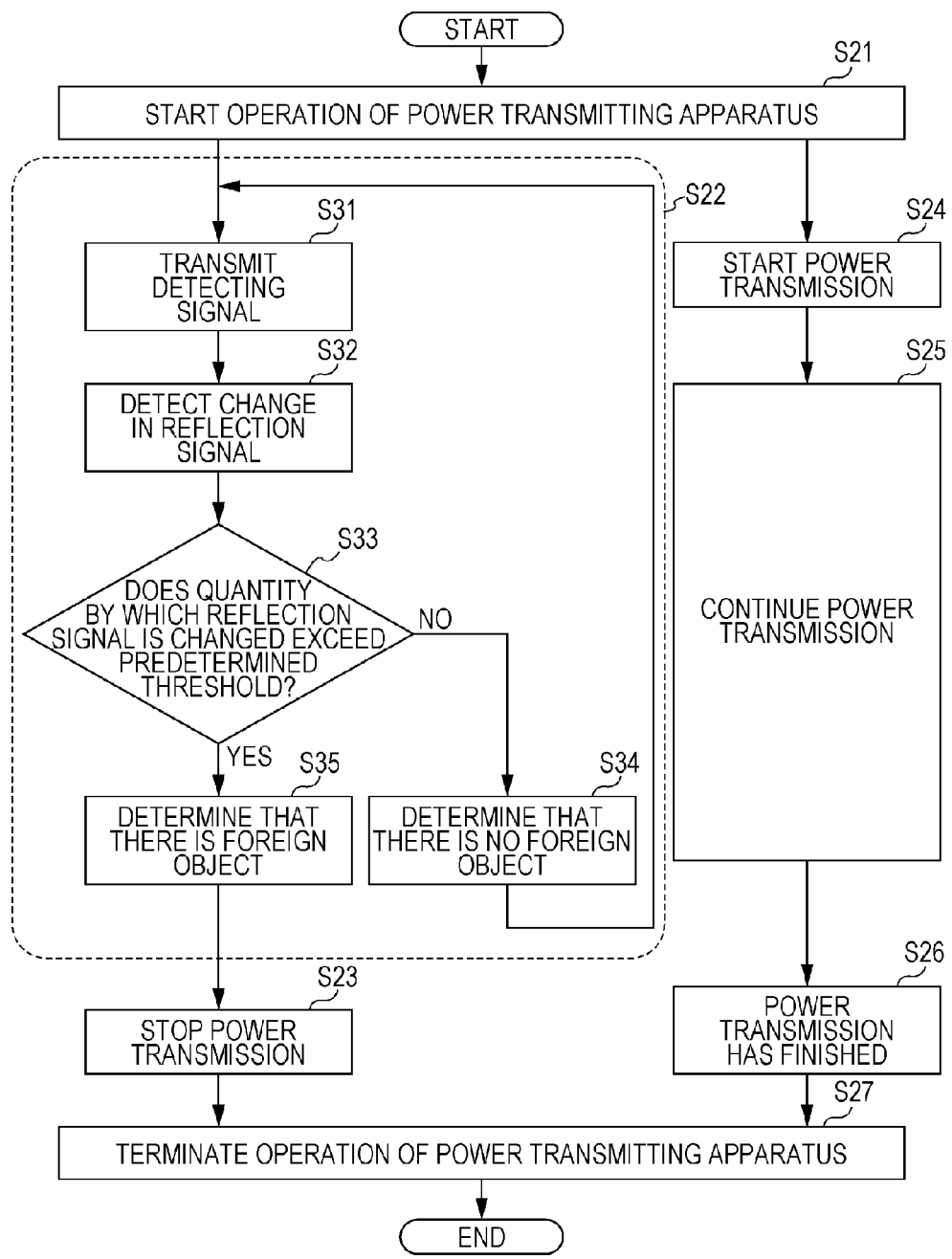

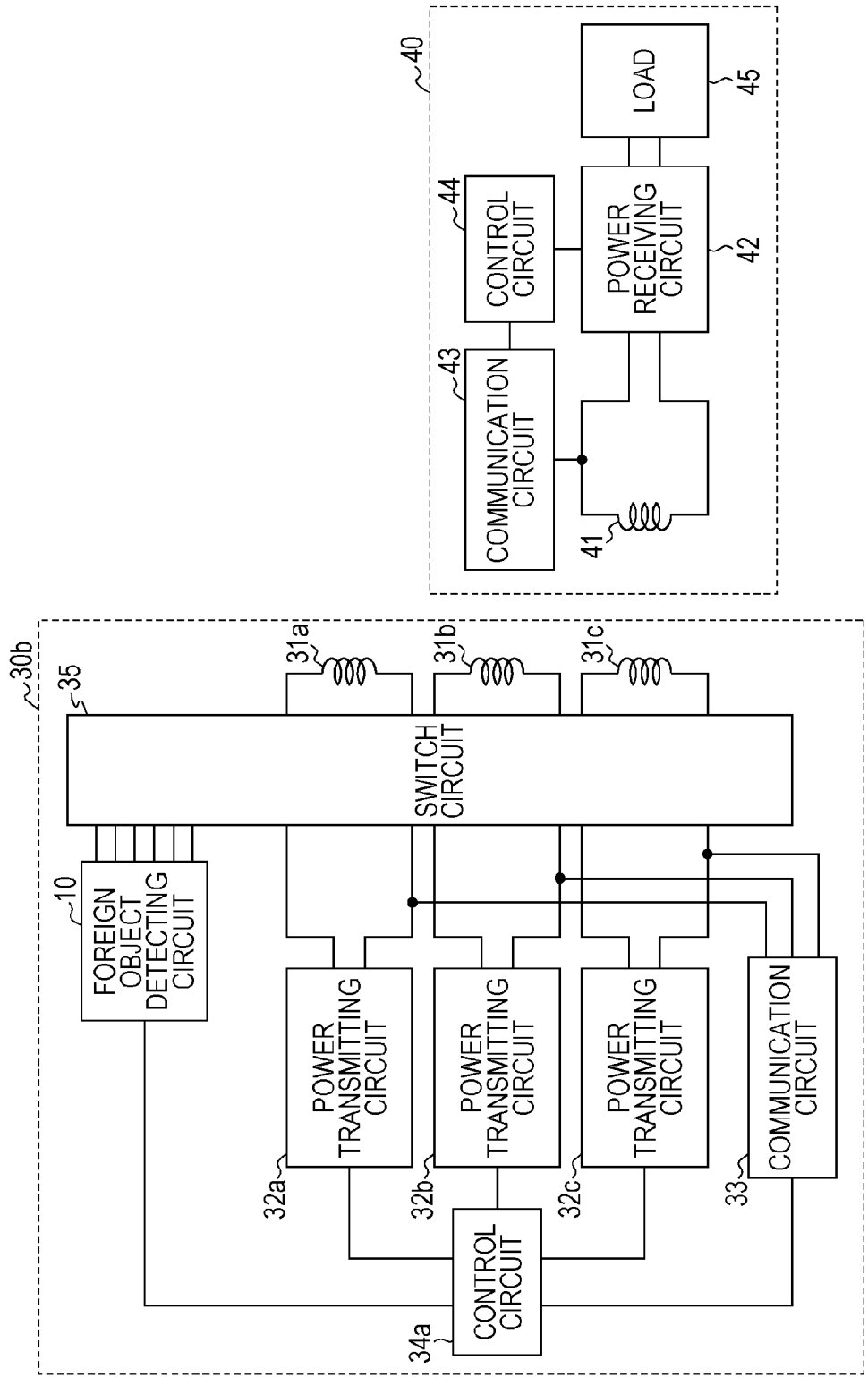

FOREIGN OBJECT DETECTING DEVICE, WIRELESS POWER TRANSMITTING APPARATUS, AND WIRELESS POWER TRANSFER SYSTEM

BACKGROUND

1. Technical Field

The present disclosure relates to a foreign object detecting device for detecting foreign objects, such as metal, human bodies, and animals, being present near a wireless power transmitting apparatus in a wireless power transfer system. The present disclosure also relates to a wireless power transmitting apparatus and a wireless power transfer system including such a foreign object detecting device.

2. Description of the Related Art

Nowadays, various mobile devices, for example, cell phones, are becoming widespread, and power consumption in mobile devices is increasing due to their enhanced functions and performance and an increase in the variety of the content. If power consumption in a mobile device operating with a limited capacity of batteries increases, the operating time of the mobile device decreases. As a technology for compensating for a limited capacity of batteries, a wireless power transfer system is attracting a lot of attention. A wireless power transfer system wirelessly transfers power from a wireless power transmitting apparatus (hereinafter simply referred to as a "power transmitting apparatus") to a wireless power receiving apparatus (hereinafter simply referred to as a "power receiving apparatus") by utilizing electromagnetic induction between a power transmitting coil of the power transmitting apparatus and a power receiving coil of the power receiving apparatus. Particularly in a wireless power transfer system using a resonance-type power transmitting coil and power receiving coil, high transmission efficiency can be maintained even when the position of the power transmitting coil and that of the power receiving coil are displaced from each other. Accordingly, the application of such a wireless power transfer system in various fields is being expected. It may be possible to widen the area where mobile devices can be charged by increasing the size of a power transmitting coil or by forming an array of multiple power transmitting coils.

SUMMARY

In a wireless power transfer system, it is desirable to detect foreign objects, such as metal, being present near a power transmitting coil or a power receiving coil with high precision and in a wide range.

In one general aspect, the techniques disclosed here feature a foreign object detecting device including: a first coil that includes a first wound wire having first and second terminals; a second coil that includes a second wound wire having third and fourth terminals and is disposed adjacent to the first coil; a third coil that includes a third wound wire having fifth and sixth terminals and is disposed adjacent to the second coil, the second coil being disposed between the first coil and the third coil, a winding direction of the third wound wire from the fifth terminal to the sixth terminal being the same as a winding direction of the first wound wire from the first terminal to the second terminal; and a foreign object detecting circuit operative to: output a first detecting signal having a first predetermined waveform to the first terminal of the first coil and output second detecting signal having a second predetermined waveform to the fifth terminal of the third coil to cause a combined magnetic field extending over the first and third coils, a polarity of the second predetermined waveform being an inverted polarity of the first predetermined waveform; measure an amount of change of an impedance value with respect to one of the first and third coils corresponding to a change in the combined magnetic field which is caused by presence of a foreign object; and determine that a foreign object above the second coil is present if the amount of change exceeds a predetermined value, where potential of each of the second, fourth, and sixth terminals is at the same as reference potential of the foreign object detecting circuit.

According to an aspect of the present disclosure, it is possible to detect foreign objects with high precision and in a wider range than the related art.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIG. 5 is a flowchart illustrating an example of the operation of the foreign object detecting device according to the first embodiment;

FIG. 8 schematically illustrates a foreign object detecting device according to a third modified example of the first embodiment;

FIG. 9 schematically illustrates a foreign object detecting device according to a fourth modified example of the first embodiment;

FIG. 13 is a flowchart illustrating an example of the operation of the power transmitting apparatus according to the second embodiment;

FIG. 14 is a block diagram illustrating a wireless power transfer system according to a third embodiment;

Figure 1:
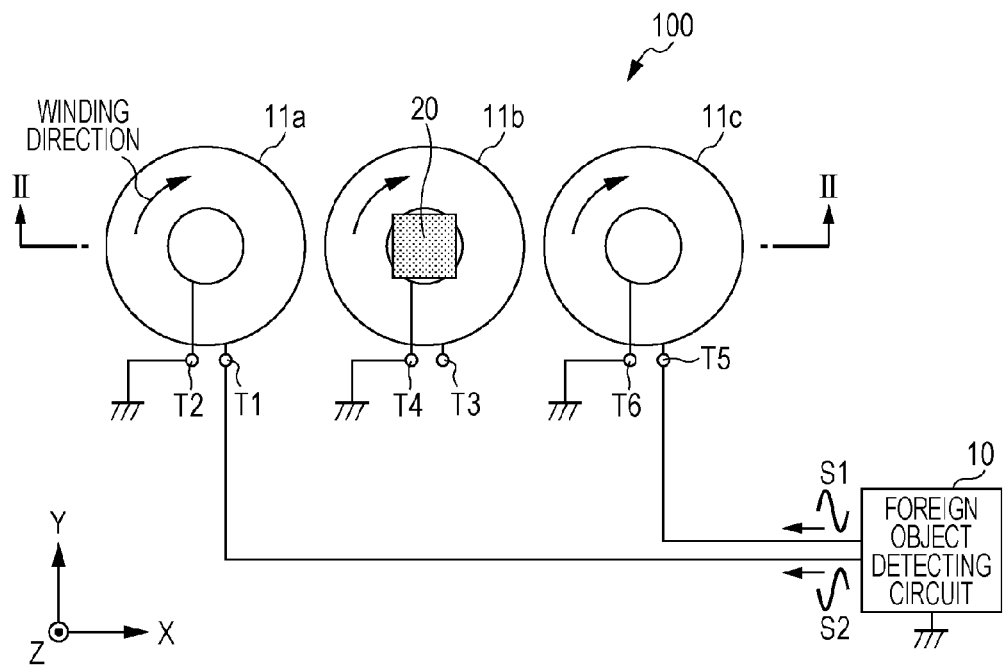
FIG. 1 schematically illustrates a foreign object detecting device according to a first embodiment.

DETAILED DESCRIPTION (Underlying Knowledge Forming Basis of the Present Disclosure)

The present inventors have found a problem that the range in which foreign objects can be detected with high precision is not sufficiently wide in the wireless power transfer system discussed in the Description of the Related Art. This problem will be discussed in detail below.

First, the definition of a "foreign object" will be explained. In the present disclosure, a "foreign object" is an object that may generate heat due to power transmitted between a power transmitting coil and a power receiving coil in a wireless power transfer system when such an object is located near the power transmitting coil or the power receiving coil. Examples of such an object are metal, human bodies, and animals.

In a wireless power transfer system, if a foreign object is present in a space through which power is transferred, the danger that heat will be generated from such a foreign object is increased. Now, it is assumed that a foreign object is metal. When power is wirelessly transferred from a power transmitting coil to a power receiving coil, a magnetic field is generated around the power transmitting coil due to a current flowing through this coil. Due to this magnetic field, an eddy current is induced and flows through the surface of the foreign object, which causes the foreign object to generate heat. The generated heat may cause a temperature rise by several tens of degrees.

In the Qi standards developed by the Wireless Power Consortium (WPC), the maximum permissible temperature is defined, and it is demanded that devices performing wireless power transfer in compliance with the Qi standards should not exceed this maximum permissible temperature. Accordingly, it is desirable that a foreign object should not enter a portion between a power transmitting coil and a power receiving coil while performing wireless power transfer. For further enhancing the safety, it is desirable to detect foreign objects near the power transmitting coil before starting transmitting power, and the power transmitting operation is started only when foreign objects are not detected as a result of performing a detecting operation. In this manner, it is possible to prevent the danger that heat generation will occur due to the presence of foreign objects.

There is also a demand for widening the area where devices, such as smartphones, can be charged. For example, there is a demand for increasing the range in which a power transmitting coil can transmit power by increasing the size of the power transmitting coil. With respect to such a demand, it is desirable to widen the area where foreign objects can be detected with high precision.

Particularly in a recharging system in which a power transmitting apparatus is placed under a console box in a vehicle, the distance between the power transmitting coil and a device, such as a smartphone, may be long. Even with a long distance between a power transmitting coil and a power receiving device in the height direction, it is still desirable to perform detection of foreign objects with high precision.

Japanese Patent No. 4525710 discloses a system in which a single coil is used both as a power transmitting coil and a detecting coil. In this system, a pulse signal is transmitted to the detecting coil, and a change in the voltage of the detecting coil is detected from reflected waves returned from the detecting coil, thereby determining the presence or the absence of foreign objects.

Japanese Patent No. 4780447 discloses that two or more detecting coils are disposed side by side in order to increase the range in which foreign objects can be detected. This publication also discloses that, for detecting foreign objects, currents out of phase with each other are supplied to a power transmitting coil (that is, a detecting coil) and a power receiving coil disposed in the axial direction. With this configuration, while preventing a signal transmitted from the power transmitting coil from being directly received by the power receiving coil, reflected waves returned from a foreign object are received with high sensitivity to detect the presence of a foreign object.

Japanese Unexamined Patent Application Publication No. 2011-234496 discloses a technology concerning, not a detecting coil for detecting foreign objects, but a power transmitting coil in a wireless power transfer system. In this system, a power transmitting coil unit in which wires (also called "windings") of two adjacent power transmitting coils are connected to each other is used. In this power transmitting coil unit, a magnetic field generated in one of the two adjacent coils is out of phase with that in the other coil. With this configuration, it is possible to reduce a leakage of an electromagnetic field generated in a location separated from the power transmitting coil unit while power is being transmitted.

As a result of analyzing the distribution of magnetic fields generated from the detecting coils disclosed in Japanese Patent Nos. 4525710 and 4780447, the present inventors have found that, with the use of these detecting coils, it is difficult to increase the range in which foreign objects can be detected with high precision. This problem will be discussed in detail.

The technology disclosed in Japanese Patent No. 4525710 will first be described below.

The detecting coil disclosed in this publication is a planar coil in which a winding is wound on a plane perpendicular to the axis passing through the center of the winding of the detecting coil.

Figure 25:
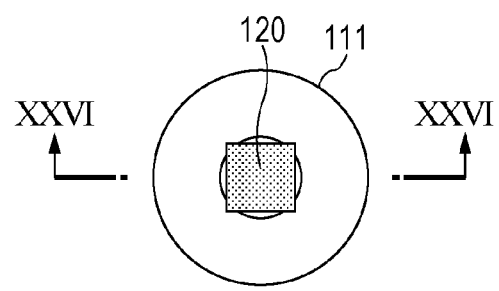
FIG. 25 is a top view schematically illustrating a detecting coil of a foreign object detecting device of the related art.

FIG. 25 is a top view schematically illustrating a detecting coil 111 of a foreign object detecting device disclosed in this publication and a foreign object 120 positioned above the detecting coil 111. For a simple representation, in FIG. 25, merely the outermost peripheral portion and the innermost peripheral portion of the winding of the detecting coil 111 are shown. In the actual detecting coil, however, the winding is wound around a portion between the outermost peripheral portion and the innermost peripheral portion for multiple turns. The detecting coils illustrated in the other drawings are also simplified in a similar manner.

Figure 26:
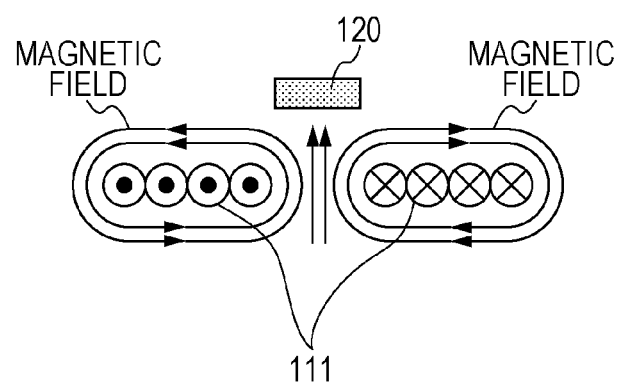
FIG. 26 is a sectional view of the detecting coil taken along line XXVI-XXVI of FIG. 25 and schematically illustrates generated magnetic fields.

FIG. 26 is a sectional view of the detecting coil 111 and the foreign object 120 taken along line XXVI-XXVI of FIG. 25 and schematically illustrates a magnetic field distribution around the detecting coil 111. In FIG. 26, the state in which a signal current is flowing within the winding of the detecting coil 111 counterclockwise as viewed from the foreign object 120 is shown. In the present disclosure, the right-handed direction as viewed from a foreign object or a power receiving coil will be referred to as the "clockwise" direction, and the left-handed direction as viewed from a foreign object or a power receiving coil will be referred to as the "counterclockwise" direction.

The foreign object 120 (a metal piece, for example) being present near the detecting coil 111 interacts with the magnetic fields generated around the detecting coil 111 to change the frequency and/or the amplitude of the signal current flowing through the detecting coil 111. By detecting this change, the foreign object 120 can be detected. The range in which the detecting coil 111 can detect the foreign object 120 is substantially restricted to the area above the detecting coil 111 on which the winding is wound. If the foreign object 120 is located right above the center of the winding of the detecting coil 111, it is more likely to be detected. However, if the foreign object 120 is separated from the winding, it is much less likely to be detected. That is, the detection sensitivity is considerably decreased.

Figure 27A:
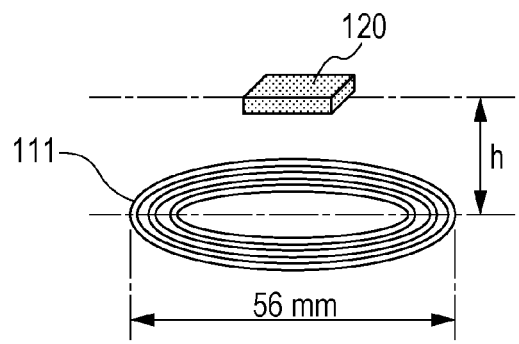
FIG. 27A illustrates the positional relationship between the detecting coil and a metal object shown in FIG. 25.
Figure 27B:
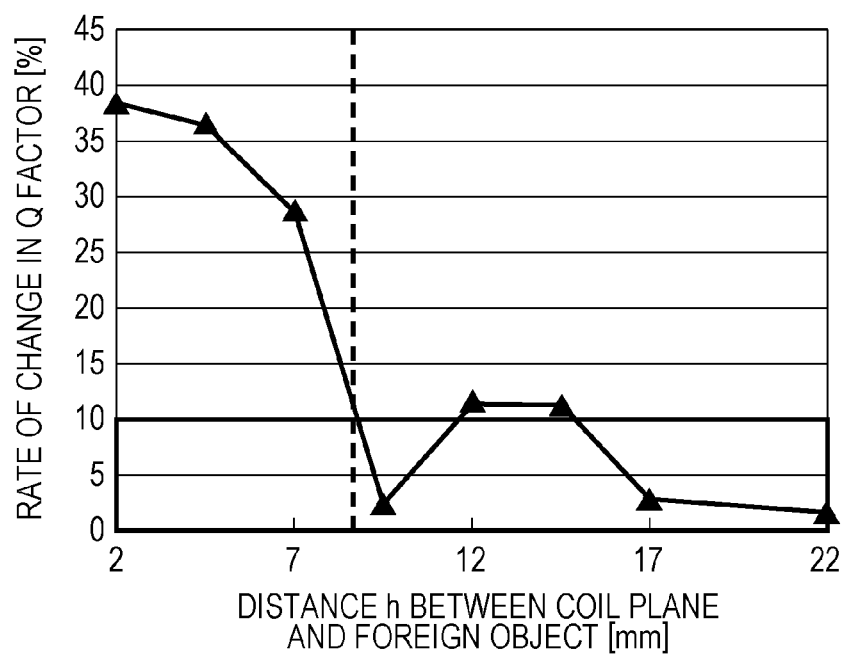
FIG. 27B is a graph illustrating the rate by which the Q factor of the detecting coil shown in FIG. 25 is changed with respect to the distance.

FIGS. 27A and 27B illustrate the results of experiments conducted for explaining the above-described situation. As shown in FIG. 27A, the foreign object 120 (metal piece) was placed above a line extending on the axis of the detecting coil 111, and the rate of a change in the Q factor was measured while varying the distance h between the foreign object 120 and the plane on which the winding of the detecting coil 111 was formed (also be called the "coil plane"). The rate of a change in the Q factor represents how much the Q factor is changed from the value of the Q factor when there is no foreign object 120. In this experiment, as the detecting coil 111, a circular detecting coil having a diameter of 56 mm was used as an example, and as the foreign object 120, a rectangular-parallelepiped iron plate (20×20×1 mm) was used as an example.

FIG. 27B shows that, when the distance h reaches about 9 mm, the rate of a change in the Q factor ($=2\pi f L/R$, f: frequency, L: inductance, and R: resistance) of the coil 111 is reduced to about 10%, that is, the detection sensitivity is considerably decreased. It is seen from this result that, in the configuration disclosed in this publication, the intensity of a magnetic field is significantly decreased at a position separated from the coil plane. It is thus difficult to increase the distance in the height direction by which foreign objects can be detected with high precision.

The technology disclosed in Japanese Patent No. 4780447 will now be described below.

In a planar flexible antenna disclosed in this publication, a plurality of detecting coil groups each including multiple planar coils disposed in the axial direction are disposed in the horizontal direction. With this configuration, it is possible to increase the range in which foreign objects can be detected. In this configuration, the multiple planar coils included in each detecting coil group are connected in parallel with each other. Accordingly, the multiple planar coils may be considered as a single coil. For the sake of simplicity, each detecting coil group will be considered as one detecting coil.

Figure 28:
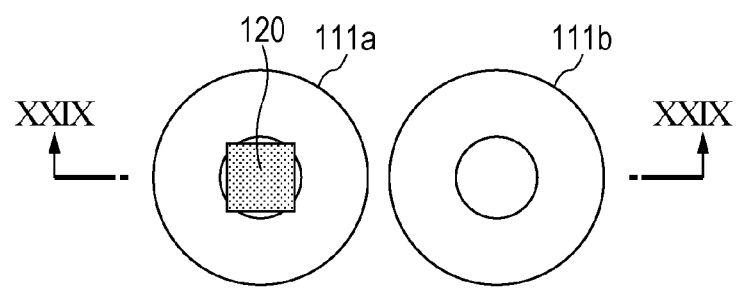
FIG. 28 is a top view schematically illustrating detecting coils of a foreign object detecting device of the related art.

FIG. 28 is a top view schematically illustrating two adjacent detecting coils 111a and 111b among the multiple detecting coils forming the planar flexible antenna disclosed in this publication. In FIG. 28, the state in which the foreign object 120 is located above the center of the detecting coil 111a is shown.

Figure 29:
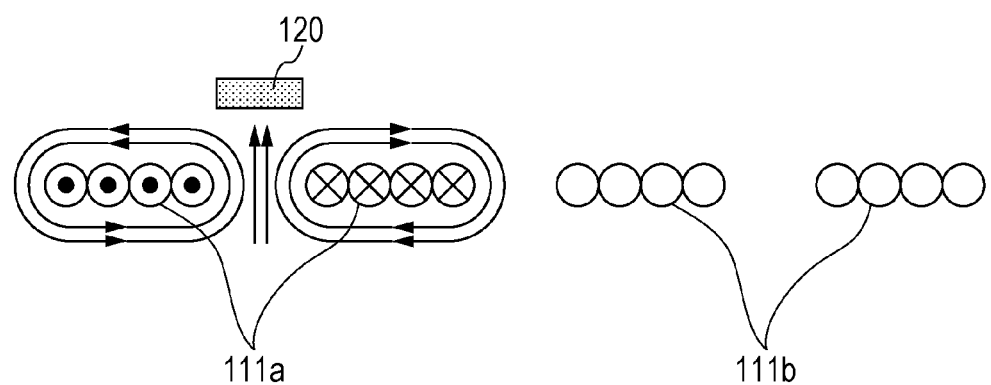
FIG. 29 is a sectional view of the detecting coils taken along line XXIX-XXIX of FIG. 28 and schematically illustrates generated magnetic fields.

FIG. 29 is a sectional view of the detecting coils 111a and 111b and the foreign object 120 taken along line XXIX-XXIX of FIG. 28 and schematically illustrates a magnetic field distribution around the detecting coil 111a. In this case, since the foreign object 120 is located above the detecting coil 111a, a detecting signal is input only into the detecting coil 111a. In this manner, in the configuration disclosed in this publication, a detecting signal is input only into one detecting coil (group) at one time.

As shown in FIG. 29, even in the case of the use of the two detecting coils 111a and 111b, the distribution of magnetic fields generated in this configuration is similar to that in the case of the use of one detecting coil as shown in FIG. 26. Accordingly, with the configuration disclosed in this publication, the magnetic field at a position separated from the coil plane is not sufficiently strong. It is thus difficult to increase the distance in the height direction by which foreign objects can be detected with high precision.

The present inventors have found a new problem that, even with the use of a foreign object detecting device in which a plurality of detecting coils (groups) are disposed, such as that disclosed in the above-described publication, it is not possible to detect foreign objects with high precision if there is a long distance between a detecting coil and a foreign object.

In view of the above-described study, with the configurations disclosed in Japanese Patent Nos. 4525710 and 4780447, it is difficult to increase the distance, in particular, the distance in the height direction, by which foreign objects can be detected with high precision.

Japanese Unexamined Patent Application Publication No. 2011-234496 discloses a technology concerning, not a detecting coil for detecting foreign objects, but a power transmitting coil used in a wireless power transfer system. In this system, a power transmitting coil unit in which wires of two adjacent power transmitting coils are connected to each other is used. In this power transmitting coil unit, a magnetic field generated in one of the two adjacent power transmitting coils is out of phase with that in the other power transmitting coil. The purpose of using such a power transmitting coil unit is to reduce a leakage of an electromagnetic field generated in a location separated from the power transmitting coil unit while power is being transmitted.

In a wireless power transfer system, it is desired that power be stably transferred from a power transmitting coil to a power receiving coil substantially without changing a magnetic field generated from the power transmitting coil while maintaining the distance between the power transmitting coil and the power receiving coil to a certain distance.

Power to be transmitted from the power transmitting coil to the power receiving coil is, for example, about 1 W to 50 kW. If a foreign object enters a portion between the power transmitting coil and the power receiving coil during power transmission, there is a danger that this foreign object may generate heat.

On the other hand, power of a signal transmitted from a detecting coil while performing detection of foreign objects is, for example, about 10 to 100 mW. Power of a signal transmitted from the detecting coil is much smaller (for example, about one thousandth or smaller of) than that transmitted from the power transmitting coil to the power receiving coil. Accordingly, when performing detection of foreign objects, there is no danger that heat generation from foreign objects will occur. Since the purpose of the use of a power transmitting coil is different from that of a detecting coil, power to be output from the power transmitting coil is very different from that from the detecting coil. If power is transmitted without detecting foreign objects, there may be a danger that heat generation from foreign objects will occur, as described above. The technology disclosed in this publication does not focus on the issue concerning the detection of foreign objects located above a coil and separated from the coil.

As discussed above, it is desirable to increase the distance by which foreign objects can be detected with high precision in a wireless power transfer system. In view of the above-described study, the present inventors have conceived the following aspects.

A foreign object detecting device according to an aspect of the present disclosure includes first, second, and third coils, and a foreign object detecting circuit. The first coil is constituted by a first wound wire having first and second terminals. The second coil is constituted by a second wound wire having third and fourth terminals and is disposed adjacent to the first coil. The third coil is constituted by a third wound wire having fifth and sixth terminals and is disposed adjacent to the second coil on a side opposite a side to which the first coil is adjacent. A winding direction of the third wound wire from the fifth terminal to the sixth terminal is the same as a winding direction of the first wound wire from the first terminal to the second terminal. The foreign object detecting circuit outputs a first detecting signal having a first predetermined waveform to the first terminal of the first coil and also outputs a second detecting signal having a second predetermined waveform to the fifth terminal of the third coil to generate a combined magnetic field extending over the first and third coils. The polarity of the second predetermined waveform is an inverted state of the polarity of the first predetermined waveform. The foreign object detecting circuit measures an amount of change of an impedance value of one of the first and third coils with respect to a change in the combined magnetic field due to the presence of a foreign object. If the amount of change exceeds a predetermined value, the foreign object detecting circuit determines that there is a foreign object above the second coil. The second, fourth, and sixth terminals are at the same potential as a reference potential of the foreign object detecting circuit.

According to the above-described aspect, the foreign object detecting device includes first, second, and third coils, and a foreign object detecting circuit. The first coil is constituted by a first wound wire having first and second terminals. The second coil is constituted by a second wound wire having third and fourth terminals and is disposed adjacent to the first coil. The third coil is constituted by a third wound wire having fifth and sixth terminals and is disposed adjacent to the second coil on a side opposite a side to which the first coil is adjacent. The winding direction of the third wound wire from the fifth terminal to the sixth terminal is the same as the winding direction of the first wound wire from the first terminal to the second terminal. The foreign object detecting circuit outputs a first detecting signal having a first predetermined waveform to the first terminal of the first coil and also outputs a second detecting signal having a second predetermined waveform to the fifth terminal of the third coil to generate a combined magnetic field extending over the first and third coils. The polarity of the second predetermined waveform is an inverted state of the polarity of the first predetermined waveform.

With this configuration, among three adjacent detecting coils, magnetic fields generated between the two outer detecting coils which sandwich the center detecting coil therebetween are coupled with each other. Accordingly, a magnetic field generated at a position separated from the center detecting coil can be intensified.

The foreign object detecting circuit measures the amount of change of the impedance value of one of the first and third coils with respect to a change in the combined magnetic field in the case of the presence of a foreign object. If this amount of change exceeds a predetermined value, the foreign object detecting circuit determines that there is a foreign object above the second coil.

With this configuration, not only the range in which foreign objects can be detected is increased by disposing multiple coils, but also a foreign object above a center detecting coil can be detected with high precision by intensifying the magnetic field above the center detecting coil.

As a result, it is possible to increase the range (in particular, the range in the height direction) in which foreign objects can be detected with high precision.

Additionally, general-purpose detecting coils may be safely used, thereby suppressing an increase in the number of components, dimensions, and manufacturing cost of the foreign object detecting device.

In the above-described description, "the amount of change of the impedance value" means the amount of change of the impedance value from that detected when there is no foreign object near the first through third coils. Accordingly, the difference between the impedance value when there is no foreign object near the first through third coils and the current impedance value is "the amount of change of the impedance value". Measuring of the amount of change of the impedance value includes, not only directly measuring of the amount of change of the impedance value, but also measuring of a change in another physical amount of change, which varies with respect to a change in the impedance value. By measuring such a change in physical amount of change, a change in the impedance value can be indirectly measured. Examples of physical quantities which vary with respect to a change in the impedance are a voltage value, a current value, the frequency of a voltage or a current, an inductance value, a coupling coefficient, and a Q factor of at least one of the first and third coils. Measuring of the amount of change in the frequency and/or the amplitude of a reflection signal based on at least one of the first and second detecting signals or combined reflection signals based on the first and second detecting signals is also measuring of the amount of change of the impedance value. The above-described definitions are also applicable to the content of the disclosure which will be given below.

Specific embodiments of the present disclosure will be described below. In the following description, XYZ coordinates shown in the drawings will be used if necessary.

First Embodiment

FIG. 1 schematically illustrates a foreign object detecting device 100 according to a first embodiment. The foreign object detecting device 100 includes multiple detecting coils, some of which are detecting coils 11a through 11c, and a foreign object detecting circuit 10 for detecting foreign objects. Hereinafter, detecting coils may also be simply called "coils". The detecting coils 11a through 11c are disposed adjacent to each other in one direction on the same plane. In FIG. 1, the state in which a foreign object 20 is located at a position facing the detecting coil 11b is shown. The foreign object detecting circuit 10 supplies currents out of phase with each other to the two detecting coils 11a and 11c at the same time, and detects the foreign object 20 on the basis of reflection signals returned from the detecting coils 11a and 11c in response to the supplied currents.

The three detecting coils 11a through 11c are shown in FIG. 1, but, in actuality, more detecting coils may be disposed. Each detecting coil has two terminals at both ends of a wound wire. One of the terminals is set to be at the same potential as a reference potential of the foreign object detecting circuit 10, while the other terminal is connected to an output terminal of the foreign object detecting circuit 10. The reference potential is a potential, which serves as a reference for a detecting signal output from the foreign object detecting circuit 10, and is typically a ground potential. The output terminal of the foreign object detecting circuit 10 is a terminal from which a detecting signal for detecting a foreign object is output. Hereinafter, a description will be given below, assuming that the reference potential is a ground potential. However, the reference potential may be any potential.

At a certain timing, the foreign object detecting circuit 10 supplies currents out of phase with each other to two detecting coils which are adjacent to both sides of one detecting coil selected from multiple detecting coils. In the first embodiment, the foreign object detecting circuit 10 transmits first and second detecting signals S1 and S2 out of phase with each other. FIG. 1 shows a situation where the first and second detecting signals S1 and S2 are transmitted to the third and first coils 11c and 11a, respectively. At another timing, the foreign object detecting circuit 10 transmits the first and second detecting signals S1 and S2 to two detecting coils (for example, the second coil 11b and a fourth coil (not shown)) which are adjacent to both sides of a detecting coil (for example, the third coil 11c) different from the second coil 11b. In this manner, the foreign object detecting circuit 10 performs a foreign object detecting operation while sequentially switching two coils that receive the first and second detecting signals S1 and S2. This makes it possible to perform detection of foreign objects over the entire area where the multiple detecting coils are disposed. Hereinafter, for the sake of simple description, the specific configuration and operation will be described below by focusing only on the three detecting coils 11a through 11c shown in FIG. 1.

Each of the detecting coils 11a through 11c is constituted by a wound wire (winding) having two terminals. The first coil 11a has a first terminal T1 and a second terminal T2. The second coil 11b has a third terminal T3 and a fourth terminal T4. The third coil 11c has a fifth terminal T5 and a sixth terminal T6. The first terminal T1, the third terminal T3, and the fifth terminal T5 are outer terminals positioned at the outer ends of the windings. Hereinafter, the first terminal T1, the third terminal T3, and the fifth terminal T5 may be simply referred to as "outer terminals". The second terminal T2, the fourth terminal T4, and the sixth terminal T6 are inner terminals positioned at the inner ends of the windings. Hereinafter, the second terminal T2, the fourth terminal T4, and the sixth terminal T6 may be simply referred to as "inner terminals". In FIG. 1, the winding direction of each wire is indicated by the arrow. In the first embodiment, the winding direction of the wires is a direction starting from the outer terminals T1, T3, and T5 to the inner terminals T2, T4, and T6, respectively, which is the clockwise direction. In the present disclosure, however, the winding direction is not particularly restricted.

The outer terminals T1, T3, and T5 are connected to output terminals of the foreign object detecting circuit 10 and receive a detecting signal output from the foreign object detecting circuit 10. However, at the timing in the state shown in FIG. 1, the outer terminal T3 of the second coil 11b is not connected to the foreign object detecting circuit 10, and a detecting signal is input only into the outer terminals T1 and T5. The inner terminals T2, T4, and T6 are connected to a ground. The outer terminals T1, T3, and T5 may be disposed at any position between the outer portions of the windings and the foreign object detecting circuit 10. The inner terminals T2, T4, and T6 may be disposed at any position between the inner portions of the windings and a ground. The outer terminals T1, T3, T5 may be nodes that are directly connected to the foreign object detecting circuit 10, and the inner terminals T2, T4, and T6 may be nodes that are directly connected to a ground. In this case, the terminals may not be clearly seen, unlike those in the example of FIG. 1. In the reference drawings in the following description, the symbol representing the terminals (white circle in FIG. 1) may be omitted.

The connection relationship between the outer terminals and the foreign object detecting circuit 10 and the connection relationship between the inner terminals and a ground may be opposite to those discussed above. That is, the outer terminals may be connected to a ground, and the inner terminals may be connected to output terminals of the foreign object detecting circuit 10. Depending on the manner in which the wires are wound, there may be a mode in which it is not clear which terminals are outer terminals and which terminals are inner terminals. The present disclosure includes such a mode.

The foreign object detecting circuit 10 transmits (may also be called "outputs" in the present disclosure) the first detecting signal S1 and the second detecting signal S2 to the two detecting coils 11c and 11a adjacent to both sides of the detecting coil 11b which is positioned at the center among the detecting coils 11a through 11c. The foreign object detecting circuit 10 then receives reflection signals generated as a result of the first and second detecting signals S1 and S2 being reflected by the two detecting coils 11c and 11a, and determines whether or not there is a foreign object located above the detecting coil 11b, on the basis of the reflection signals. The first detecting signal S1 has a predetermined waveform, while the second detecting signal S2 has a waveform in which the polarity of the waveform of the first detecting signal S1 is inverted. Accordingly, a current induced by one of the first and second detecting signals S1 and S2 flows clockwise on the plane including the detecting coils 11a through 11c, and at the same time, a current induced by the other one of the first and second detecting signals S1 and S2 flows counterclockwise on the plane including the detecting coils 11a through 11c. That is, currents flow through the detecting coils 11a and 11c in opposite directions at the same time.

Each of the first and second detecting signals S1 and S2 may be an alternating current (AC) signal or a pulse signal. The pulse signal may be a unipolar or bipolar pulse signal. If the first and second detecting signals S1 and S2 are sine waves, such as those shown in FIG. 1, the foreign object detecting circuit 10 generates detecting signals S1 and S2 having a phase difference by 180 degrees.

Figure 2:
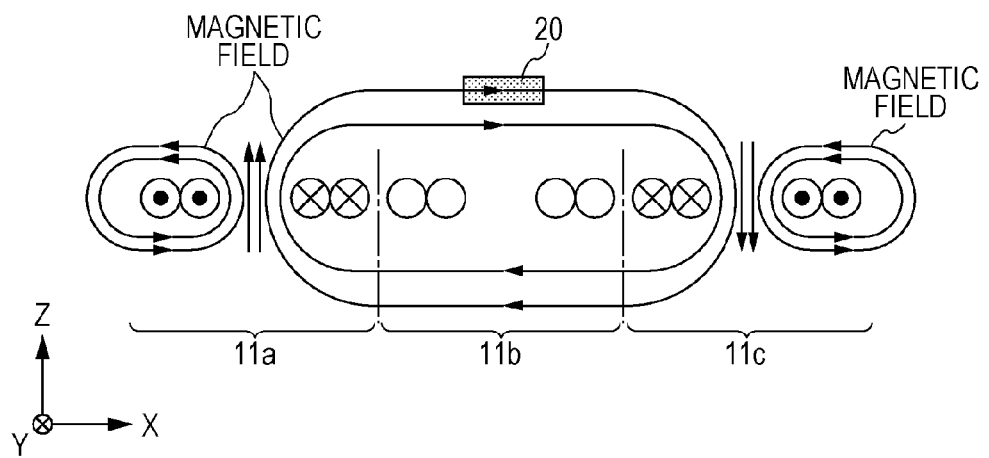
FIG. 2 is a sectional view of detecting coils taken along line II-II of FIG. 1 and schematically illustrates generated magnetic fields.

FIG. 2 is a sectional view of the detecting coils 11a through 11c and the foreign object 20 taken along line II-II of FIG. 1 and schematically illustrates generated magnetic fields. The foreign object detecting circuit 10 determines whether or not there is a foreign object 20 near the detecting coil 11b by observing the reflection signals returned from the detecting coils 11a and 11c. As shown in FIG. 2, upon receiving the first and second detecting signals S1 and S2 output from the foreign object detecting circuit 10, the detecting coils 11c and 11a each form a magnetic field near the corresponding detecting coil 11c or 11a. At a certain moment, a current flows through the detecting coil 11a counterclockwise, while a current flows through the detecting coil 11c clockwise. Accordingly, the same +Y-direction current flows through the wire on the +X side (right side) of the detecting coil 11a and through the wire on the −X side (left side) of the detecting coil 11c. As a result, a combined magnetic field is generated such that it extends over the two detecting coils 11a and 11c. The combined magnetic field is formed to surround the detecting coil 11b sandwiched between the two detecting coils 11a and 11c. In this case, if the foreign object 20 is present above (on the +Z side of) the detecting coil 11b, part of the combined magnetic field is blocked by the foreign object 20 to change the reflection signals. When the foreign object 20 generates a capacitance with each of the detecting coils 11a and 11c, the inductance of each of the detecting coils 11a and 11c is changed due to the generated capacitance. With respect to a change in the inductance, the frequency of the reflection signal is also changed. If the inductance of each of the detecting coils 11a and 11c decreases, the frequency of the reflection signal increases. In contrast, if the inductance of each of the detecting coils 11a and 11c increases, the frequency of the reflection signal decreases. When the foreign object 20 is heated due to an induced current, energy of the first and second detecting signals S1 and S2 is consumed to decrease the amplitudes of the reflection signals. A change in a reflection signal may be detected by measuring the reflection signal directly or by measuring a composite signal of a transmitted detecting signal and a received reflection signal.

A composite reflection signal may be a signal indicating the difference (may also be called a "difference signal") between the reflection signal obtained from the first detecting signal S1 and the reflection signal obtained from the second detecting signal S2 output from the foreign object detecting circuit 10. Since the second detecting signal S2 is a signal in which the polarity of the first detecting signal S1 is inverted, the amplitude of this difference signal is about twice as high as that of each of the reflection signals. By taking the difference between two reflection signals, the detection sensitivity can be enhanced. For example, the foreign object detecting circuit 10 reads two reflection signals at a portion between the terminal from which the first detecting signal S1 is output and the terminal from which the second detecting signal S2 is output, thereby measuring a difference between the reflection signal obtained from the first detecting signal S1 and the reflection signal obtained from the second detecting signal S2. With this configuration, only one measurement circuit is required for measuring the impedance, amplitude, and frequency.

The foreign object detecting circuit 10 determines the presence or the absence of the foreign object 20, for example, in the following manner. First, the foreign object detecting circuit 10 measures the frequency and/or the amplitude of reflection signals or a composite signal when there is no foreign object 20 near the detecting coils 11a through 11c, and then stores the measured values in a memory as reference values. Upon detecting a reflection signal or a composite signal having the frequency and/or the amplitude different from the reference values, the foreign object detecting circuit 10 determines that there is a foreign object 20.

In the above-described example, the presence or the absence of a foreign object is determined on the basis of a change in the frequency and/or the amplitude of received reflection signals or a composite signal. Alternatively, the presence or the absence of a foreign object may be determined, on the basis of a change in another physical amount of change, which varies with respect to a change in the impedance, as described above. This alternative is applicable to other embodiments, which will be discussed later.

The foreign object detecting device 100 shown in FIG. 1 is configured so that currents will flow in opposite directions through the two detecting coils 11a and 11c which sandwich the detecting coil 11b therebetween. For implementing this configuration, the foreign object detecting circuit 10 generates the two detecting signals S1 and S2 having opposite polarities. Alternatively, by using a foreign object detecting circuit 10a which generates only one detecting signal, currents may also flow in opposite directions through the two detecting coils 11a and 11c, as in the foreign object detecting circuit 10. A detecting signal generated by the foreign object detecting circuit 10a is, for example, an AC signal or a pulse signal, as in the detecting signals generated by the foreign object detecting circuit 10. Such an alternative using the foreign object detecting circuit 10a will be discussed below with reference to FIGS. 3 and 4.

Figure 3:
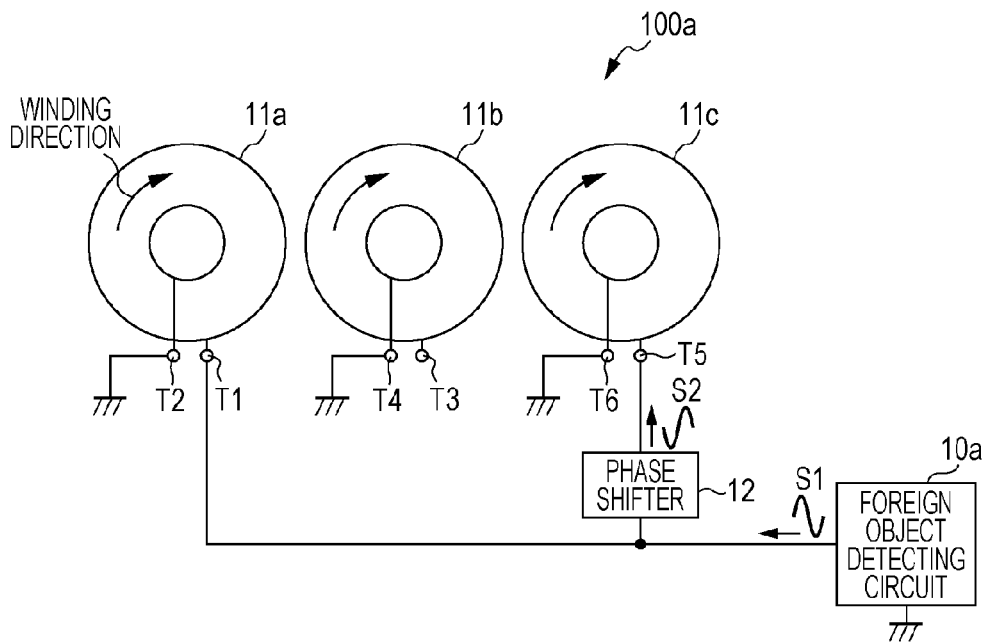
FIG. 3 schematically illustrates a foreign object detecting device according to a first modified example of the first embodiment.

FIG. 3 schematically illustrates a foreign object detecting device 100a according to a first modified example of the first embodiment. The foreign object detecting device 100a includes at least one phase shifter 12, in addition to the foreign object detecting circuit 10a. In the example shown in FIG. 3, the phase shifter 12 is connected between the fifth terminal T5 of the detecting coil 11c and the foreign object detecting circuit 10a. The detecting coils 11a through 11c have wires being wound in the same direction on a single coil plane. The foreign object detecting circuit 10a generates the first detecting signal S1 and transmits it to the first coil 11a and the phase shifter 12. The phase shifter 12 generates the second detecting signal S2 by inverting the polarity of the first detecting signal S1 and transmits the second detecting signal S2 to the fifth terminal T5 of the detecting coil 11c. In this manner, the foreign object detecting circuit 10a outputs the second detecting signal S2 to the fifth terminal T5 via the phase shifter 12. This configuration is effective when the first detecting signal S1 generated by the foreign object detecting circuit 10a is a period signal (for example, an AC signal having a sine wave) in which the waveform of the first half of each period has the inverted shape of the waveform of the second half. With this configuration, the second detecting signal S2 which is substantially out of phase with the first detecting signal S1 (by about 180 degrees) generated by the foreign object detecting circuit 10a can be input into the detecting coil 11c. In the foreign object detecting device 100a shown in FIG. 3, the first detecting signal S1 transmitted from the foreign object detecting circuit 10a is caused to diverge in two directions toward the detecting coil 11a and the phase shifter 12, and the second detecting signal S2 obtained by delaying the phase of the first detecting signal S1 by about 180 degrees in the phase shifter 12 is transmitted to the detecting coil 11c. Since currents flow through the two detecting coils 11a and 11c in opposite directions, a combined magnetic field similar to that shown in FIG. 2 is formed between the detecting coils 11a and 11c. Thus, the foreign object detecting circuit 10a is able to detect a foreign object positioned above the detecting coil 11b in a manner similar to that discussed in the first embodiment. The phase shifter 12 may be connected to the terminal T1 of the first coil 11a instead of the fifth terminal T5 of the third coil 11c. In a mode in which the inner terminals T2 and T6 are connected to the output terminals of the foreign object detecting circuit 10a, the phase shifter 12 is connected to one of the inner terminals T2 and T6.

Figure 4:
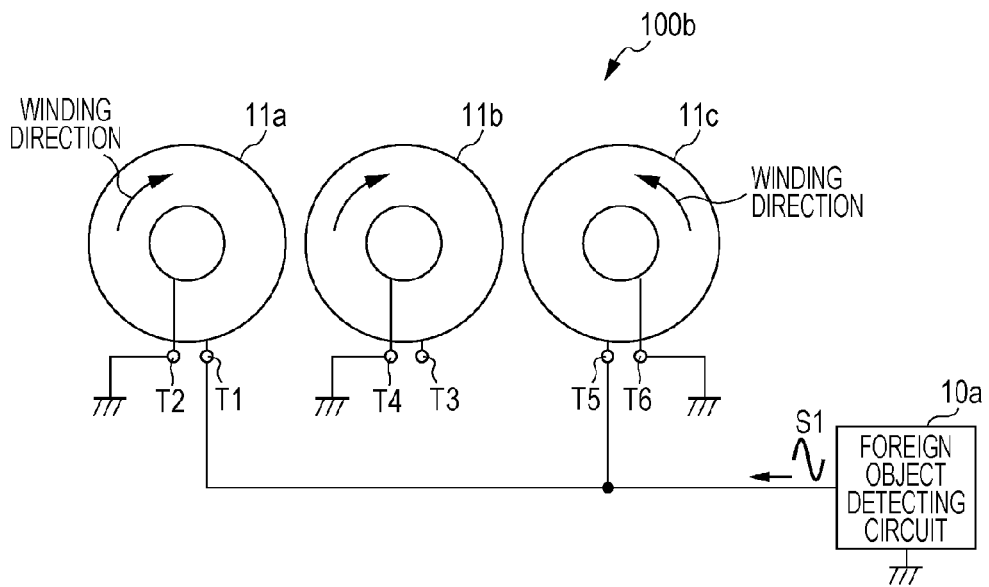
FIG. 4 schematically illustrates a foreign object detecting device according to a second modified example of the first embodiment.

FIG. 4 schematically illustrates a foreign object detecting device 100b according to a second modified example of the first embodiment. The two detecting coils 11a and 11c disposed adjacent to both sides of the detecting coil 11b have wires being wound in opposite directions on a single coil plane. That is, the winding direction of the wire from the terminal T1 to the terminal T2 is opposite to that from the terminal T5 to the terminal T6. The foreign object detecting circuit 10a generates the single detecting signal S1 and outputs it to the first terminal T1 of the detecting coil 11a and the fifth terminal T5 of the detecting coil 11c. In the foreign object detecting device 100b shown in FIG. 4, the first detecting signal S1 transmitted from the foreign object detecting circuit 10a is caused to diverge in two directions so that the same detecting signal S1 can be transmitted to the detecting coils 11a and 11c. Since the detecting coils 11a and 11c have wires being wound in opposite directions on a single coil plane, currents flow through the two detecting coils 11a and 11c in opposite directions. Accordingly, a combined magnetic field similar to that shown in FIG. 2 is formed between the detecting coils 11a and 11c. This enables the foreign object detecting circuit 10a to detect a foreign object being present above the detecting coil 11b in a manner similar to that discussed in the first embodiment. The first detecting signal S1 may be transmitted to the inner terminals T2 and T6 instead of the outer terminals T1 and T5.

In the foreign object detecting devices 100a and 100b shown in FIGS. 3 and 4, respectively, the foreign object detecting circuit 10a outputs only one detecting signal, thereby increasing the simplicity of the configuration of the entire circuitry. In the foreign object detecting device 100a shown in FIG. 3, the multiple detecting coils 11a through 11c are constituted by the same component, thereby reducing the manufacturing cost. On the other hand, in the foreign object detecting device 100b shown in FIG. 4, it is possible to cause currents to flow through the two detecting coils 11a and 11c in opposite directions without having to use the phase shifter 12. If the use of multiple detecting coils having wires being wound in different directions is less expensive than the use of the phase shifter 12, the manufacturing cost may be reduced by employing the configuration shown in FIG. 4.

An example of the operation of the foreign object detecting device according to the first embodiment will be described below with reference to FIG. 5. In the following description, the operation of the foreign object detecting device 100 shown in FIG. 1 will be discussed. However, the following operation is similarly applicable to the foreign object detecting devices 100a and 100b shown in FIGS. 3 and 4.

First, in step S1, the operation of the foreign object detecting device 100 is started, for example, the foreign object detecting device 100 (such as an integrated circuit (IC) and a memory) is initialized. Then, in step S2, foreign object detecting processing is executed. The foreign object detecting processing in step S2 will be discussed below in detail. In step S11, the foreign object detecting circuit 10 transmits first and second detecting signals to the first coil 11a and the third coil 11c. In the configuration shown in FIG. 3, the second detecting signal is transmitted to the third coil 11c via the phase shifter 12. In the configuration shown in FIG. 4, the first and second detecting signals are the same signal. The current flows through one of the first and third coils 11a and 11c clockwise, while the current flows through the other one of the first and third coils 11a and 11c counterclockwise. Thus, a combined magnetic field is generated such that it extends over the first and third coils 11a and 11c. If a foreign object is present, the combined magnetic field is changed. Accordingly, a reflection signal obtained from each the first and second detecting signals is also changed with respect to a change in the combined magnetic field.

Then, in step S12, the foreign object detecting circuit 10 detects a change in the reflection signal caused by the presence of a foreign object.

Then, in step S13, the foreign object detecting circuit 10 determines whether or not the amount of change of the reflection signal exceeds a predetermined threshold. The amount of change of the reflection signal refers to a difference between the value of the frequency or the amplitude of a reflection signal when there is no foreign object near the detecting coils 11a through 11c and that of the reflection signal detected by the foreign object detecting circuit 10. If it is determined in step S13 that the above-described amount of change exceeds the predetermined threshold, the foreign object detecting circuit 10 determines in step S14 that there is a foreign object above the second coil 11b. If it is determined in step S13 that the above-described amount of change does not exceed the predetermined threshold, the foreign object detecting circuit 10 determines in step S15 that there is no foreign object above the second coil 11b. If it is determined in step S14 that there is a foreign object, the foreign object detecting circuit 10 repeats steps S11 through S14 until it determines in step S13 that the above-described amount of change does not exceed the predetermined threshold, that is, it determines in step S15 that there is no foreign object.

If it is determined in step S15 that there is no foreign object as a result of executing the foreign object detecting processing in step S2, the process proceeds to step S3. In step S3, the foreign object detecting circuit 10 outputs a signal indicating that there is no foreign object. If the foreign object detecting device 100 is included in a wireless power transfer system, this signal is transmitted to, for example, a power transmitting apparatus in this system. Upon receiving this signal, the power transmitting apparatus performs a certain operation, such as starting of a power transmitting operation. The destination of this signal is not restricted to the power transmitting apparatus, and instead, the signal may be transmitted to any device that requires information concerning the presence or the absence of a foreign object.

The advantages of the foreign object detecting device according to the first embodiment will now be described below with reference to FIGS. 6A through 6C.

Figure 6A:
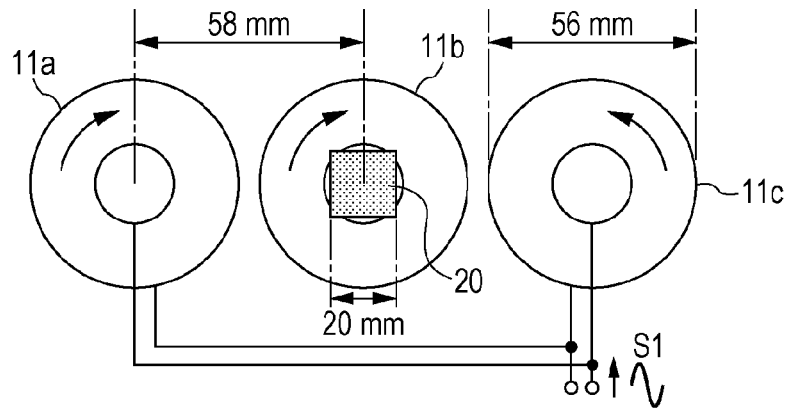
FIG. 6A is a top view schematically illustrating detecting coils of a foreign object detecting device in an implementation example of the first embodiment.

FIG. 6A is a top view schematically illustrating the detecting coils 11a through 11c in an implementation example of the foreign object detecting device 100b shown in FIG. 4. The winding direction of the wire of the detecting coil 11a from the outer terminal to the inner terminal is opposite to that of the detecting coil 11c from the outer terminal to the inner terminal. The diameter of each of the detecting coils 11a through 11c is 56 mm. The number of turns of the wire of each of the detecting coils 11a and 11c is 12. The detecting coils 11a through 11c are aligned with a center-to-center distance of 58 mm. The configuration of the detecting coil 11b is the same as that of the detecting coil 11a. The winding direction of the wire of the detecting coil 11b is also the same as that of the detecting coil 11a. A foreign object 20 constituted by a rectangular-parallelepiped iron plate (20×20×1 mm) is located above and at the center of the detecting coil 11b. Under the above-described conditions, the rate of a change in the Q factor was measured while varying the distance between the top surface of the detecting coil 11b and the bottom surface of the foreign object 20. The feeding points of the detecting coils 11a and 11c were connected to the foreign object detecting circuit which output the single detecting signal S1. The detecting coils 11a and 11c were connected to the foreign object detecting circuit so that currents would flow through the detecting coils 11a and 11c in opposite directions.

Figure 6B:
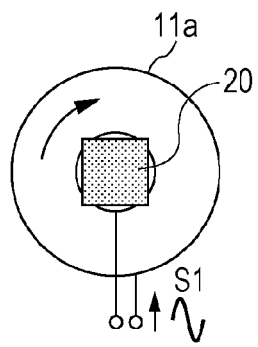
FIG. 6B is a top view illustrating a detecting coil of a foreign object detecting device according to a comparative example.

FIG. 6B is a top view illustrating a detecting coil 11a of a foreign object detecting device according to a comparative example. This foreign object detecting device includes only the detecting coil 11a among the multiple detecting coils 11a through 11c shown in FIG. 6A. A foreign object 20 constituted by a rectangular-parallelepiped iron plate (20×20×1 mm) is located above and at the center of the detecting coil 11a. Under these conditions, the rate of a change in the Q factor was measured while varying the distance between the top surface of the detecting coil 11a and the bottom surface of the foreign object 20. The feeding point of the detecting coil 11a was connected to the foreign object detecting circuit which output the single detecting signal S1.

Figure 6C:
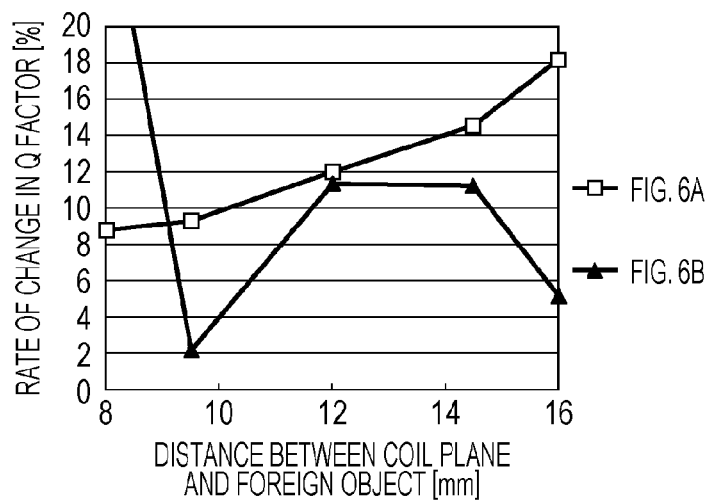
FIG. 6C is a graph illustrating the rates by which the Q factors are changed due to the presence of foreign objects shown in FIGS. 6A and 6B with respect to the distance.

FIG. 6C is a graph illustrating the rates by which the Q factors ($=2\pi fL/R$, f: frequency, L: inductance, and R: resistance) are changed due to the presence of the foreign objects 20 in the configurations shown in FIGS. 6A and 6B with respect to the distance. Concerning the detecting coils 11a and 11c shown in FIG. 6A, the Q factor in the case of the presence of the foreign object 20 (Q factor calculated from the complex impedance: Q1) was measured, and the rate $\Delta Q1$ representing how much the Q factor (Q1) changed from the Q factor (Q01) in the case of the absence of a foreign object was calculated by using the following equation.

$$\Delta Q1=(Q1-Q01)/Q01\times 100 [\%] \text{ (FIG. 6A)}$$

Similarly, concerning the detecting coil 11a shown in FIG. 6B, the Q factor (Q2) in the case of the presence of the foreign object 20 was measured, and the rate $\Delta Q2$ representing how much the Q factor (Q2) changed from the Q factor (Q02) in the case of the absence of a foreign object was calculated by using the following equation.

$$\Delta Q2=(Q2-Q02)/Q02\times 100 [\%] \text{ (FIG. 6B)}$$

FIG. 6C shows that the rate $\Delta Q1$, which is a rate of a change in the Q factor of the first embodiment shown in FIG. 6A, is greater than the rate $\Delta Q2$ in the comparative example shown in FIG. 6B when the distance between the coil plane and the foreign object 20 is about 10 mm. Even after the distance exceeds about 10 mm, the rate $\Delta Q1$ does not drop. That is, in the configuration of the first embodiment, more stable output can be obtained than in the configuration of the comparative example using the single detecting coil 11a. The reason for this is that the two detecting coils 11a and 11c form a combined magnetic field extending over the detecting coils 11a and 11c so that the magnetic field above the detecting coil 11b can be intensified, as shown in FIG. 2.

A detecting signal input into each of the two detecting coils 11a and 11c may be a period signal (for example, an AC signal having a sine wave) in which the waveform of the first half of each period has the inverted shape of the waveform of the second half. In this case, detecting signals or currents substantially out of phase with each other flow through the detecting coils 11a and 11c. This makes it possible to detect a foreign object being present above the detecting coil 11b with high precision. In this case, "substantially out of phase" means that the phase difference between two detecting signals or currents flowing through the detecting coils 11a and 11c is within a range to such a degree as to detect the foreign object 20 above the detecting coil 11b sandwiched between the detecting coils 11a and 11c. This advantage may be achieved if the range of the phase difference between two detecting signals or currents is 180±90 degrees, but, more desirably, the range of the phase difference is 180±45 degrees.

Factors to be considered when supplying signals or currents out of phase with each other to two detecting coils may be:

(a) whether the winding directions of wires of two detecting coils are set to be the same direction or opposite directions;

(b) whether a detecting signal is input into an outer terminal or an inner terminal of each detecting coil;

(c) whether or not a phase shifter is used if only one detecting signal is used; and (d) if two detecting signals are used, whether or not the phase difference between the two detecting signals is set to be about 180 degrees.

By considering one or a plurality of these factors, currents substantially out of phase with each other can be supplied to and flow through two detecting coils.

As described above, in the foreign object detecting device according to the first embodiment, it is possible to more reliably detect a foreign object separated from a detecting coil interposed between two detecting coils, while suppressing an increase in the number of components, dimensions, and manufacturing cost of the foreign object detecting device.

The results of examining the inductance which may influence the detection sensitivity will be discussed below.

Figure 7A:
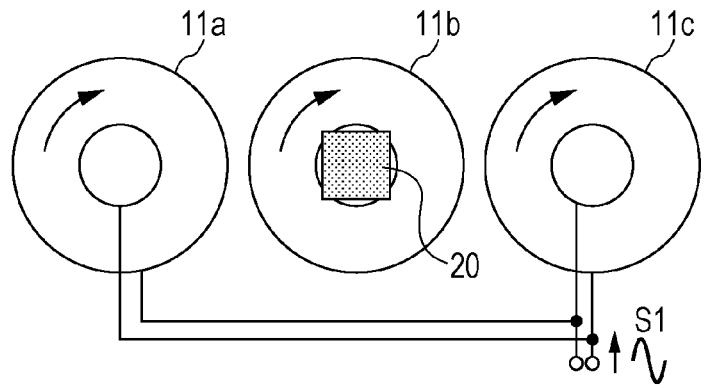
FIG. 7A is a top view illustrating the configuration of detecting coils of a foreign object detecting device in another implementation example of the first embodiment.
Figure 7B:
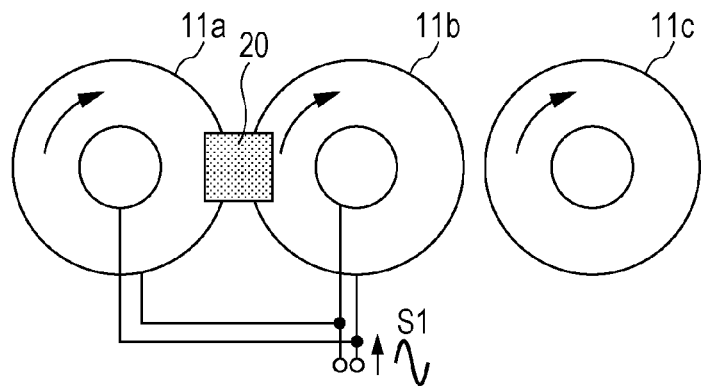
FIG. 7B illustrates an example of a comparative example in which detecting signals out of phase with each other are output to two adjacent detecting coils.
Figure 7C:
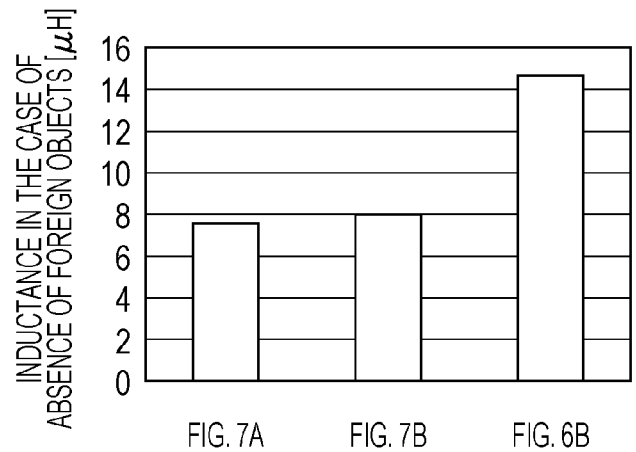
FIG. 7C is graph illustrating the results of measuring inductance values in the case of the absence of foreign objects in the configurations shown in FIGS. 7A, 7B, and 6B.

FIG. 7A illustrates the configuration of another implementation example of the first embodiment. FIG. 7B illustrates a comparative example in which detecting signals out of phase with each other are output to two adjacent detecting coils 11a and 11b. In these examples, the configuration of the detecting coils 11a through 11c is the same as that of the detecting coil 11a shown in FIG. 6A. FIG. 7C is a graph illustrating the results of measuring the inductance values in the case of the absence of foreign objects in the configurations shown in FIGS. 7A, 7B, and 6B.

In both of the examples shown in FIGS. 7A and 7B, the winding directions (indicated by the arrows in FIGS. 7A and 7B) of the wires of the detecting coils 11a through 11c from the outer terminals to the inner terminals are the same. In the example shown in FIG. 7A, a single detecting signal output from the foreign object detecting circuit is caused to diverge and is input into the inner terminal (or the outer terminal) of the detecting coil 11a and also into the outer terminal (or the inner terminal) of the detecting coil 11c. Thus, currents out of phase with each other (reverse-phase currents) flow through the detecting coils 11a and 11c. That is, a current flows through one of the detecting coils 11a and 11c clockwise, and, at the same time, a current flows through the other one of the detecting coils 11a and 11c counterclockwise. As a result, a combined magnetic field extending over the detecting coils 11a and 11c is generated.

In the comparative example shown in FIG. 7B, the relationship between the detecting coils 11a and 11c shown in FIG. 7A is applied to the relationship between the two adjacent detecting coils 11a and 11b. That is, a single detecting signal output from the foreign object detecting circuit is caused to diverge and is input into the inner terminal (or the outer terminal) of the detecting coil 11a and also into the outer terminal (or the inner terminal) of the detecting coil 11b. Thus, currents out of phase with each other (reverse-phase currents) flow through the detecting coils 11a and 11b. That is, a current flows through one of the detecting coils 11a and 11b clockwise, and, at the same time, a current flows through the other one of the detecting coils 11a and 11b counterclockwise. As a result, a combined magnetic field extending over the detecting coils 11a and 11b is generated.

In each of the examples shown in FIGS. 7A and 7B, the inductance value of one of the two detecting coils through which reverse-phase currents were flowing was measured. In the comparative example shown in FIG. 6B, the inductance value of the detecting coil 11a was measured.

FIG. 7C shows that the inductance value in the example shown in FIG. 7A is substantially equal to that in the example shown in FIG. 7B, and both of the inductance values are about half the inductance value in the example shown in FIG. 6B.

When the inductance of a detecting coil is changed, the frequency of a detecting signal is also changed. More specifically, as the inductance increases, the frequency decreases. In the configuration shown in FIG. 6A or 7A, the detection sensitivity to a foreign object positioned above a detecting coil is enhanced, but the detection sensitivity to a foreign object positioned above and between two adjacent detecting coils is relatively low.

Accordingly, for detecting a foreign object positioned above and between two adjacent detecting coils, the use of the configuration shown in FIG. 7B in which signals out of phase with each other are supplied to the two adjacent detecting coils is effective. By combining the configuration shown in FIG. 6A or 7A and the configuration shown in FIG. 7B, it is possible to reliably detect foreign objects positioned on a plane parallel with the coil plane. With this combined configuration, foreign objects are detected by switching between two detecting methods corresponding to the two configurations. In this case, it is desirable that the frequencies of detecting signals used for the two detecting methods be the same or be close to each other. Then, the same foreign object detecting circuit may be used for the two methods, thereby decreasing the number of components and increasing the simplicity of the foreign object detecting device.

For making the frequencies of detecting signals used for the two detecting methods approximate to each other, the inductance values of the detecting coils in the two detecting methods are desirably close to each other. As shown in FIG. 7C, the inductance value in the example shown in FIG. 7A and that in the example shown in FIG. 7B are very close to each other. Accordingly, the foreign object detecting device of the first embodiment and that shown in FIG. 7B can be suitably combined. By combining the two foreign object detecting methods in this manner, it is possible to detect foreign objects over the entire area where heat generation from a foreign object may occur, including a region above and between two adjacent detecting coils and a region above the center of each detecting coil.

The foreign object detecting device according to the first embodiment may be applicable to a wireless power transmitting apparatus or a wireless power transfer system including one or multiple power transmitting coils (for example, a large power transmitting coil or an array of power transmitting coils), which will be discussed in second and third embodiments. It is thus possible to reliably detect foreign objects before starting power transmission or while power transmission is being performed.

The foreign object detecting device including three detecting coils has been discussed. However, as described above, the foreign object detecting device may include four or more detecting coils. An example of a foreign object detecting device including four detecting coils will be described below with reference to FIGS. 8 and 9.

FIG. 8 schematically illustrates a foreign object detecting device 100c according to a third modified example of the first embodiment. The foreign object detecting device 100c includes four detecting coils 11a through 11d, a foreign object detecting circuit 10b, a phase shifter 12, and switches 13a and 13b. The four detecting coils 11a through 11d are aligned adjacent to each other on a single plane. The winding directions of the wires of the detecting coils 11a through 11d from the outer terminals to the inner terminals are the same (clockwise in FIG. 8). At one timing, the foreign object detecting device 100c supplies a detecting signal S1 to two detecting coils which are alternately disposed with one detecting coil therebetween (detecting coils 11a and 11c or detecting coils 11b and 11d) among the four detecting coils 11a through 11d so that currents will flow in these two detecting coils in opposite directions.

The outer terminals of the detecting coils 11a and 11b are connected to the switch 13b, while the outer terminals of the detecting coils 11c and 11d are connected to the switch 13a. The switch 13a is connected to the foreign object detecting circuit 10b via the phase shifter 12. The switch 13b is directly connected to the foreign object detecting circuit 10b.

As in the foreign object detecting circuit 10a shown in FIGS. 3 and 4, the foreign object detecting circuit 10b generates a single detecting signal S1 and also controls the switches 13a and 13b. For example, when causing the switch 13b to connect the detecting coil 11a to the foreign object detecting circuit 10b, the foreign object detecting circuit 10b also causes the switch 13a to connect the detecting coil 11c to the foreign object detecting circuit 10b. Conversely, when causing the switch 13b to connect the detecting coil 11b to the foreign object detecting circuit 10b, the foreign object detecting circuit 10b also causes the switch 13a to connect the detecting coil 11d to the foreign object detecting circuit 10b. A detecting signal S2 input into the detecting coil 11c or 11d is substantially out of phase with the detecting signal S1 (by about 180 degrees) input into the detecting coil 11a or 11b by the use of the phase shifter 12. Accordingly, when power is being supplied to the detecting coils 11a and 11c, a foreign object above the detecting coil 11b can be detected with high precision. When power is being supplied to the detecting coils 11b and 11d, a foreign object above the detecting coil 11c can be detected with high precision.

FIG. 9 schematically illustrates a foreign object detecting device 100d according to a fourth modified example of the first embodiment. The foreign object detecting device 100d includes four detecting coils 11a through 11d, a foreign object detecting circuit 10c, and switches 13a and 13b. The fourth modified example is different from the third modified example in that the foreign object detecting circuit 10c outputs two detecting signals S1 and S2, instead of the provision of the phase shifter 12. Except for this point, the fourth modified example is the same as the third modified example.

The foreign object detecting circuit 10c generates the two detecting signals S1 and S2, as in the foreign object detecting circuit 10 shown in FIG. 1, and also controls the switches 13a and 13b. For example, when causing the switch 13b to connect the detecting coil 11a to the foreign object detecting circuit 10c, the foreign object detecting circuit 10c also causes the switch 13a to connect the detecting coil 11c to the foreign object detecting circuit 10c. Conversely, when causing the switch 13b to connect the detecting coil 11b to the foreign object detecting circuit 10c, the foreign object detecting circuit 10c also causes the switch 13a to connect the detecting coil 11d to the foreign object detecting circuit 10c. The detecting signal S2 input into the detecting coil 11a or 11b is substantially out of phase with the detecting signal S1 (by about 180 degrees) input into the detecting coil 11c or 11d. Accordingly, when power is being supplied to the detecting coils 11a and 11c, a foreign object above the detecting coil 11b can be detected with high precision. When power is being supplied to the detecting coils 11b and 11d, a foreign object above the detecting coil 11c can be detected with high precision.

In the foreign object detecting devices 100c and 100d shown in FIGS. 8 and 9, respectively, by using at least four detecting coils and at least two switches, it is possible to detect foreign objects above the multiple detecting coils with high sensitivity and with a simple structure.

Examples in which multiple detecting coils are linearly disposed have been discussed. However, detecting coils may be disposed two-dimensionally. In this case, advantages similar to those described above are also obtained.

If a foreign object detecting device includes five or more detecting coils, the number of detecting coils connected to each switch is increased. Then, among the multiple detecting coils, two detecting coils which are alternately disposed with one detecting coil therebetween can be selectively connected to the foreign object detecting circuit. Alternatively, the foreign object detecting device may include three or more switches according to the necessity.

All the winding directions of the multiple detecting coils 11a through 11d in the foreign object detecting devices 100c and 100d shown in FIGS. 8 and 9, respectively, are the same. However, such a configuration is only an example. For example, the winding directions of some detecting coils may be set to be opposite to those of the remaining detecting coils. In this case, by supplying the same detecting signal to two detecting coils wound in opposite directions, currents flow through these two detecting coils in opposite directions. For causing currents to flow through two detecting coils in opposite directions, the configuration shown in FIG. 1 (the foreign object detecting circuit outputs multiple detecting signals of polarities which are opposite to each other), the configuration shown in FIG. 3 (a phase shifter is used), and the configuration shown in FIG. 4 (the winding directions of coils set to be opposite) may be suitably combined.

Second Embodiment

Figure 10:
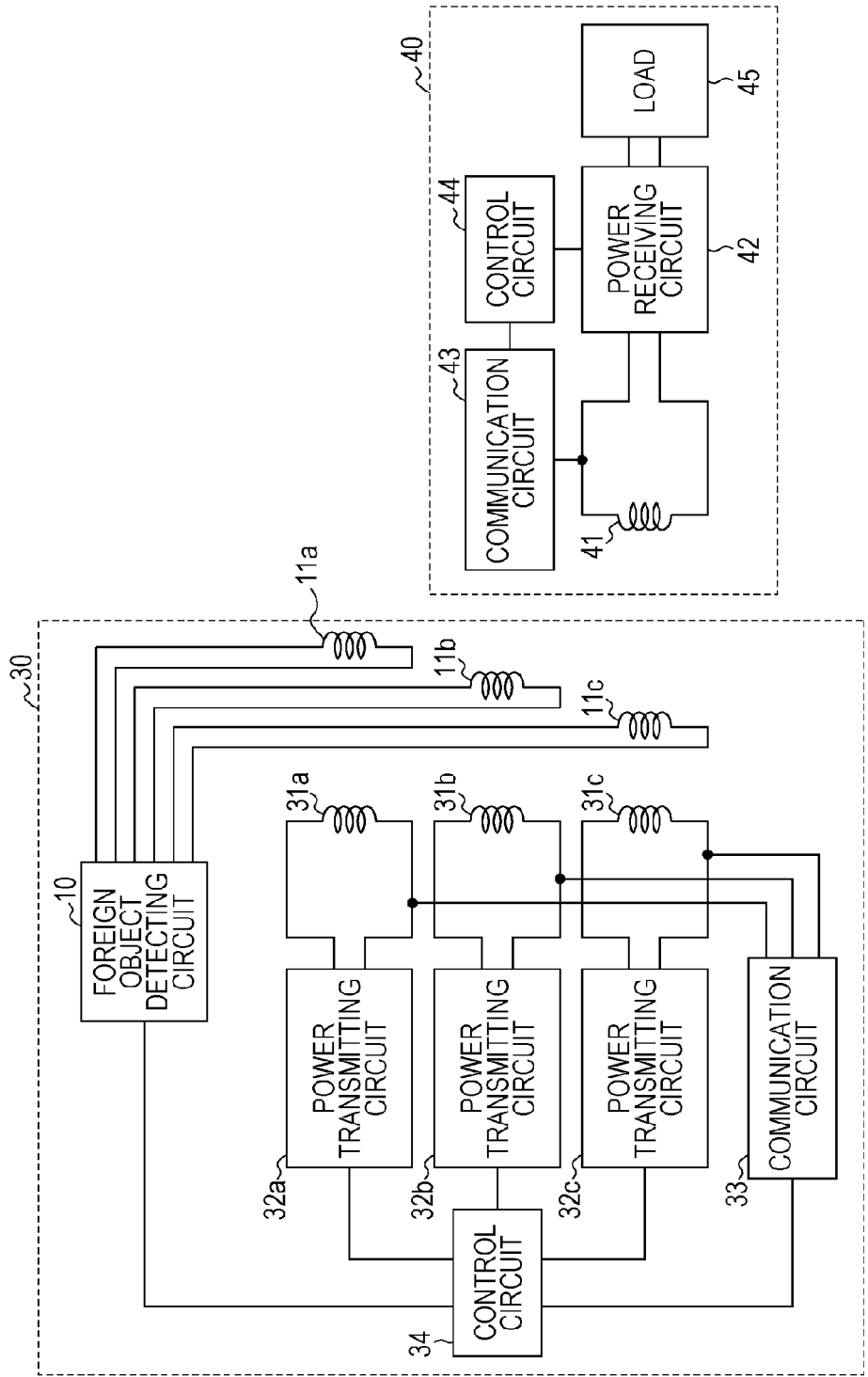
FIG. 10 is a block diagram illustrating a wireless power transfer system according to a second embodiment.

FIG. 10 is a block diagram illustrating a wireless power transfer system according to a second embodiment. The wireless power transfer system includes a power transmitting apparatus 30 and a power receiving apparatus 40. The power transmitting apparatus 30 includes a foreign object detecting circuit 10, detecting coils 11a through 11c, power transmitting coils 31a through 31c, power transmitting circuits 32a through 32c, a communication circuit 33, and a control circuit 34. The power transmitting circuits 32a through 32c are connected to the power transmitting coils 31a through 31c, respectively, and generate and output high-frequency power. The control circuit 34 of the power transmitting apparatus 30 is connected to the foreign object detecting circuit 10, the power transmitting circuits 32a through 32c, and the communication circuit 33 and controls these elements. The power receiving apparatus 40 includes a power receiving coil 41, a power receiving circuit 42, a communication circuit 43, a control circuit 44, and a load 45. The control circuit 44 of the power receiving apparatus 40 controls the power receiving circuit 42 and the communication circuit 43. The power transmitting apparatus 30 includes the foreign object detecting device 100 (foreign object detecting circuit 10 and detecting coils 11a through 11c) shown in FIG. 1, and is thus able to detect foreign objects above the power transmitting coil 31b.

The power transmitting coils 31a through 31c and the detecting coils 11a through 11c may be, for example, thin planar coils formed on a substrate, and may be formed on a substrate by using a single-layer conductor pattern or multiple-layer conductor patterns stacked on each other. Alternatively, a winding coil using copper wire, Litz wire, or twisted pair wire may be utilized.

The power transmitting circuits 32a through 32c may be full-bridge inverters or oscillator circuits, such as class D or class E oscillators. The power transmitting circuits 32a through 32c are connected to a direct current (DC) power source (not shown) and convert DC power received from the DC power source into AC power. The power transmitting circuits 32a through 32c transmit AC power to a space by using at least one of the power transmitting coils 31a through 31c.

The control circuit 34 is a processor for controlling the entire operation of the power transmitting apparatus 30. The control circuit 34 may be implemented by a combination of a central processing unit (CPU) and a memory storing a computer program therein, or by an integrated circuit, such as a microcomputer.

The foreign object detecting circuit 10 performs the operation for detecting foreign objects discussed in the first embodiment. The foreign object detecting circuit 10 may be implemented by a combination of a plurality of components, such as a microcomputer, a pulse generator, a measuring circuit, and a switch circuit. The measuring circuit measures a physical amount of change, such as the voltage, current, frequency, and inductance, in the circuit, which varies with respect to a change in the impedance.

The communication circuit 33 communicates with the communication circuit 43 of the power receiving apparatus 40, and receives information concerning, for example, the impedance of the load 45 in the power receiving apparatus 40. This information is transmitted to the control circuit 34 and is used for controlling the transmission frequency and transmission power.

The power receiving circuit 42 may include various circuits, such as a rectifier circuit, a frequency converter circuit, a constant-voltage-and-constant-current control circuit, and a communication modulator-demodulator circuit. The power receiving circuit 42 converts received high-frequency AC power into DC power or low-frequency AC power that can be used by the load 45. Various sensors for measuring a voltage and a current output from the power receiving coil 41 may be provided.

Figure 11A:
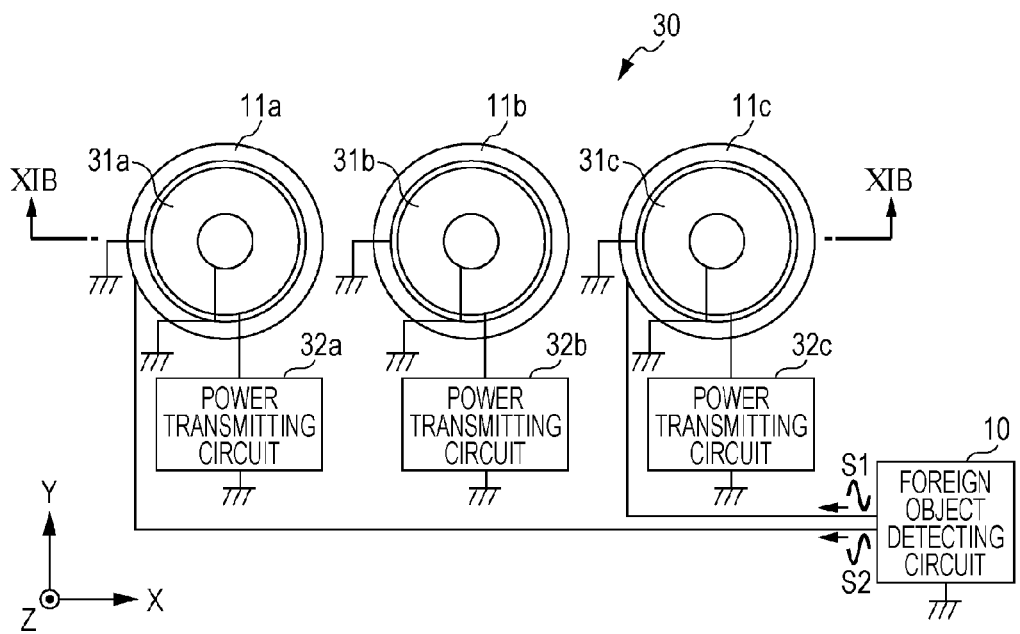
FIG. 11A schematically illustrates part of a power transmitting apparatus shown in FIG. 10.
Figure 11B:
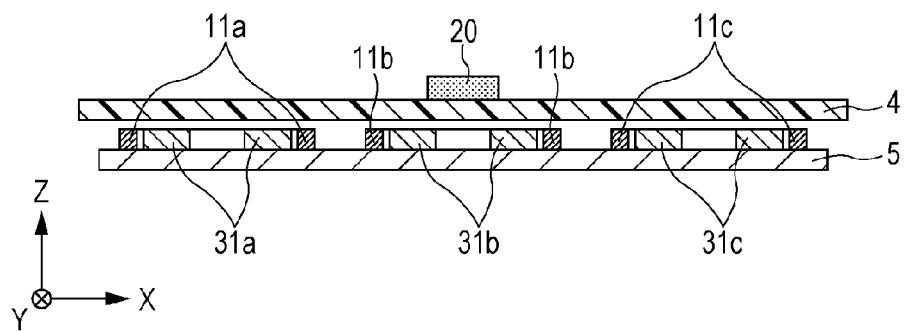
FIG. 11B is a sectional view of detecting coils and power transmitting coils taken along line XIB-XIB of FIG. 11A.

FIG. 11A schematically illustrates part of the power transmitting apparatus 30 shown in FIG. 10. FIG. 11A illustrates the positional relationship between the detecting coils 11a through 11c and the power transmitting coils 31a through 31c on the XY plane. FIG. 11B is a sectional view of the detecting coils 11a through 11c and the power transmitting coils 31a through 31c taken along line XIB-XIB of FIG. 11A. As shown in FIG. 11B, the detecting coils 11a through 11c and the power transmitting coils 31a through 31c are disposed on a magnetic substrate 5. The power transmitting apparatus 30 is disposed within a housing (cover) 4. The housing 4 is made of a material which transmits an electromagnetic field, such as plastic.

For simple representation, the magnetic substrate 5, the housing 4, and circuits other than the foreign object detecting circuit 10 and the power transmitting circuit 32a through 32c are not shown in FIG. 11A, and all the circuits within the power transmitting apparatus 30 are not shown in FIG. 11B. In the power transmitting apparatus 30, the detecting coils 11a through 11c are disposed around the outer peripheries of the power transmitting coils 31a through 31c, respectively. That is, the detecting coils 11a through 11c and the power transmitting coils 31a through 31c are provided based on a one-to-one correspondence. With this configuration, it is possible to reliably detect a foreign object 20 which may generate heat above the power transmitting coils 31a through 31c. By providing the detecting coils 11a through 11c and the power transmitting coils 31a through 31c on the same plane, the thickness of the power transmitting apparatus 30 is decreased. With the configuration shown in FIGS. 11A and 11B, by separately providing the detecting coils 11a through 11c from the power transmitting coils 31a through 31c, the foreign object 20 may be detected independently of the power transmitting operation, that is, it may be detected even during the power transmitting operation.

The frequency of the detecting signals S1 and S2 output from the foreign object detecting circuit 10 may be the same as or may be different from the frequency of transmission power. If the frequency of transmission power is, for example, 100 to 200 kHz, the frequency of the detecting signals S1 and S2 may be the same as or be higher than (for example, 100 kHz to 2 MHz) the frequency of transmission power.

In the configuration shown in FIGS. 11A and 11B, the detecting coils 11a through 11c and the power transmitting coils 31a through 31c are provided on the same plane. However, this is only an example. The detecting coils 11a through 11c may be disposed above the power transmitting coils 31a through 31c, for example, between the power transmitting coils 31a through 31c and the housing 4. With this configuration, it is possible to enhance the detection sensitivity to foreign objects. Alternatively, the detecting coils 11a through 11c may be disposed under the power transmitting coils 31a through 31c, for example, between the power transmitting coils 31a through 31c and the magnetic substrate 5. With this configuration, it is possible to enhance the wireless power transfer efficiency of the power transmitting coils 31a through 31c.

FIGS. 10 through 11B show an example of the power transmitting apparatus 30 including the three power transmitting coils 31a through 31c. However, this is only an example, and the power transmitting apparatus 30 may include four or more power transmitting coils.

Figure 12A:
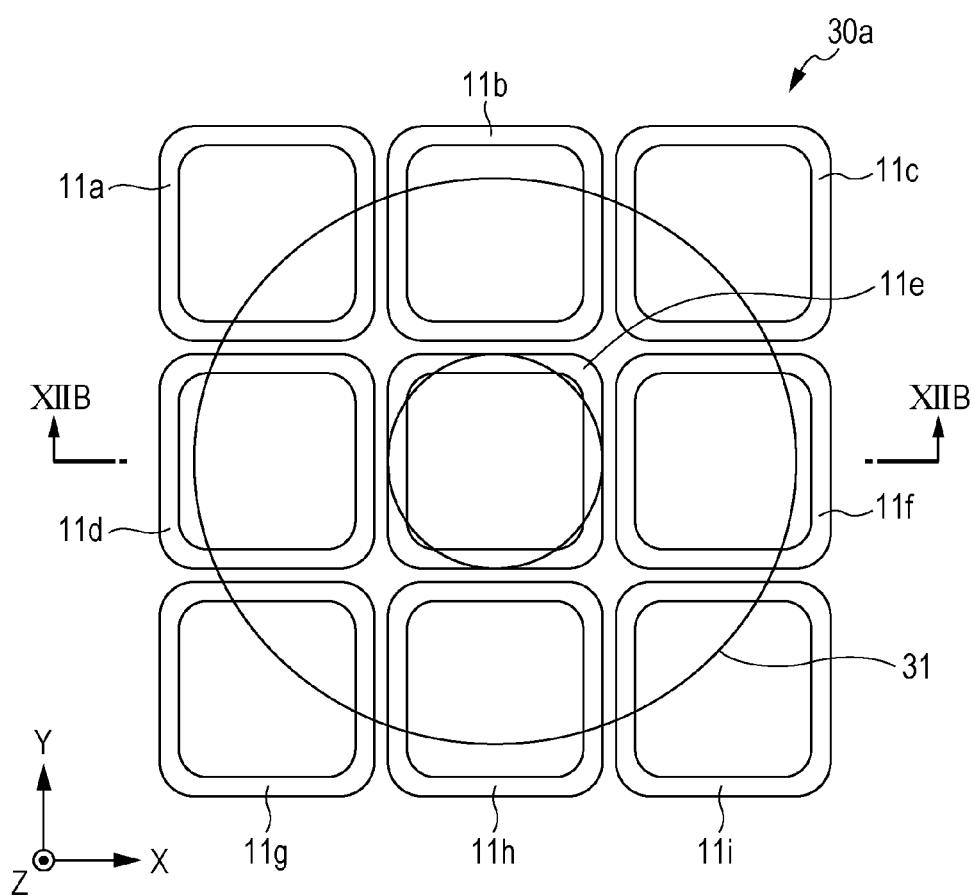
FIG. 12A illustrates the positional relationship between detecting coils and a power transmitting coil of a wireless power transfer system according to a first modified example of the second embodiment.
Figure 12B:
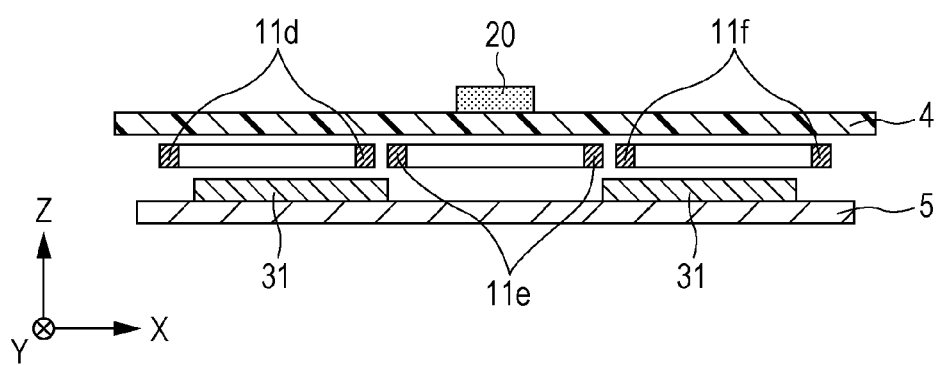
FIG. 12B is a sectional view of the detecting coils and the power transmitting coil taken along line XIIB-XIIB of FIG. 12A.

FIGS. 12A and 12B illustrate the disposition of detecting coils 11a through 11i and a power transmitting coil 31 of a power transmitting apparatus 30a according to a modified example of the second embodiment. FIG. 12A illustrates the positional relationship between the detecting coils 11a through 11i and the power transmitting coil 31 on the XY plane. FIG. 12B is a sectional view of the detecting coils 11a through 11i and the power transmitting coil 31 taken along line XIIB-XIIB of FIG. 12A. For simple representation, the magnetic substrate 5, the housing 4, and all the circuits within the power transmitting apparatus 30a are not shown in FIG. 12A, and all the circuits within the power transmitting apparatus 30a are not shown in FIG. 12B.

FIGS. 12A and 12B illustrate an example in which the multiple smaller detecting coils 11a through 11i are disposed on the single large power transmitting coil 31. In this modified example, the detecting coils 11a through 11i are disposed on a single plane parallel with and above the power transmitting coil 31. By two-dimensionally disposing the multiple detecting coils 11a through 11i smaller than the power transmitting coil 31 in this manner, a small foreign object 20 can be detected with high precision. With the configuration shown in FIGS. 12A and 12B, as well as that shown in FIGS. 11A and 11B, by separately providing the detecting coils 11a through 11i from the power transmitting coil 31, the foreign object 20 may be detected independently of the power transmitting operation, that is, it may be detected even during the power transmitting operation.

In the second embodiment, the multiple detecting coils are disposed along the bottom surface of the housing 4. However, this is only an example. The multiple detecting coils may be disposed at any positions at which a magnetic field generated by the power transmitting coils passes. For example, the multiple detecting coils may be disposed at any positions on a curved plane surrounding the power transmitting coils.

As discussed above, in the power transmitting apparatus 30 or 30*a* according to the second embodiment, it is possible to detect foreign objects even while a power transmitting operation is being performed, and as a result, it is possible to prevent a danger that heat generation from foreign objects will occur. An example of the operation of the power transmitting apparatus 30 according to the second embodiment will be described below with reference to FIG. 13.

First, in step S21, the operation of the power transmitting apparatus 30 is started, for example, after the power transmitting apparatus 30 is powered ON, the power transmitting apparatus 30 (such as an IC and a memory) is initialized. Then, while power is being transmitted in steps S24 and S25, foreign object detecting processing is executed in step S22. The foreign object detecting processing in step S22 will be discussed below in detail. In step S31, the foreign object detecting circuit 10 transmits a detecting signal. Then, in step S32, the foreign object detecting circuit 10 detects a change in a reflection signal caused by the presence of a foreign object by using the method discussed in the first embodiment. Then, in step S33, the foreign object detecting circuit 10 determines whether or not the amount of change of the reflection signal exceeds a predetermined threshold. If the result of step S33 is YES, the foreign object detecting circuit 10 determines in step S35 that there is a foreign object. Then, in step S23, power transmission is stopped. In step S27, the operation of the power transmitting apparatus 30 is terminated. If the result of step S33 is NO, the foreign object detecting circuit 10 determines in step S34 that there is no foreign object. In this case, the foreign object detecting circuit 10 repeats steps S31 through S34 until it determines in step S33 that the above-described amount of change exceeds the predetermined threshold (that is, until the entry of a foreign object is detected and power transmission is stopped). However, if the power transmitting operation which is being performed together with the foreign object detecting processing is finished in step S26 and power supply to the power transmitting apparatus 30 is terminated, the operation of the power transmitting apparatus 30 is terminated in step S27. After step S34, instead of immediately returning to step S31, it may wait until a predetermined time elapses, and then, a detecting signal may be transmitted again in step S31. Then, a waste of power is avoided.

After the operation of the power transmitting apparatus 30 has been terminated in step S27, if it is determined that there is no foreign object and power transmission is restarted, the state in which the foreign object detecting circuit 10 is electrically connected to the multiple detecting coils may be switched to the state in which the power transmitting circuits are electrically connected to the power transmitting coils before restarting power transmission. Such a control operation is performed by the control circuit 34 shown in FIG. 10.

If it is determined that there is no foreign object and power transmission is restarted, power transmission may be performed by using two adjacent power transmitting coils. This makes it possible to more easily transmit power to a single large receiving coil, compared with the use of one power transmitting coil. In this case, the directions of AC power flowing through the two power transmitting coils are desirably the same.

Third Embodiment

FIG. 14 is a block diagram illustrating a wireless power transfer system according to a third embodiment. The wireless power transfer system includes a power transmitting apparatus 30*b* and a power receiving apparatus 40. The power transmitting apparatus 30*b* includes a foreign object detecting circuit 10, power transmitting coils 31*a* through 31*c*, power transmitting circuits 32*a* through 32*c*, a communication circuit 33, a control circuit 34*a*, and a switch circuit 35. The control circuit 34*a* controls the foreign object detecting circuit 10, the power transmitting circuits 32*a* through 32*c*, the communication circuit 33, and the switch circuit 35. The configuration of the power receiving apparatus 40 is similar to that shown in FIG. 10. In the power transmitting apparatus 30*b*, the power transmitting coils 31*a* through 31*c* also serve as the detecting coils 11*a* through 11*c* shown in FIG. 10. That is, the power transmitting coils 31*a* through 31*c* are used for both purposes of power transmission and detection of foreign objects. The switch circuit 35 connects at least one of the power transmitting circuits 32*a* through 32*c* to at least one of the power transmitting coils 31*a* through 31*c* or connects the foreign object detecting circuit 10 to the two power transmitting coils 31*a* and 31*c* among the power transmitting coils 31*a* through 31*c*. When at least one of the power transmitting circuits 32*a* through 32*c* is connected to at least one of the power transmitting coils 31*a* through 31*c*, the power transmitting apparatus 30*b* is able to transmit power to the power receiving apparatus 40. When the foreign object detecting circuit 10 is connected to the two power transmitting coils 31*a* and 31*c*, the power transmitting apparatus 30*b* is able to detect a foreign object above the power transmitting coil 31*b* sandwiched between the two power transmitting coils 31*a* and 31*c*. With this configuration, the provision of the detecting coils 11*a* through 11 *c* shown in FIG. 10 can be omitted, thereby decreasing the number of components and thus reducing the cost. Additionally, since the power transmitting coils 31*a* through 31*c*, which are relatively large components, can be used for both purposes of power transmission and detection of foreign objects, the size, weight, and thickness of the power transmitting apparatus 30*b* can be reduced. As a result, the designing flexibility of the power transmitting apparatus 30*b* is increased.

Figure 15:
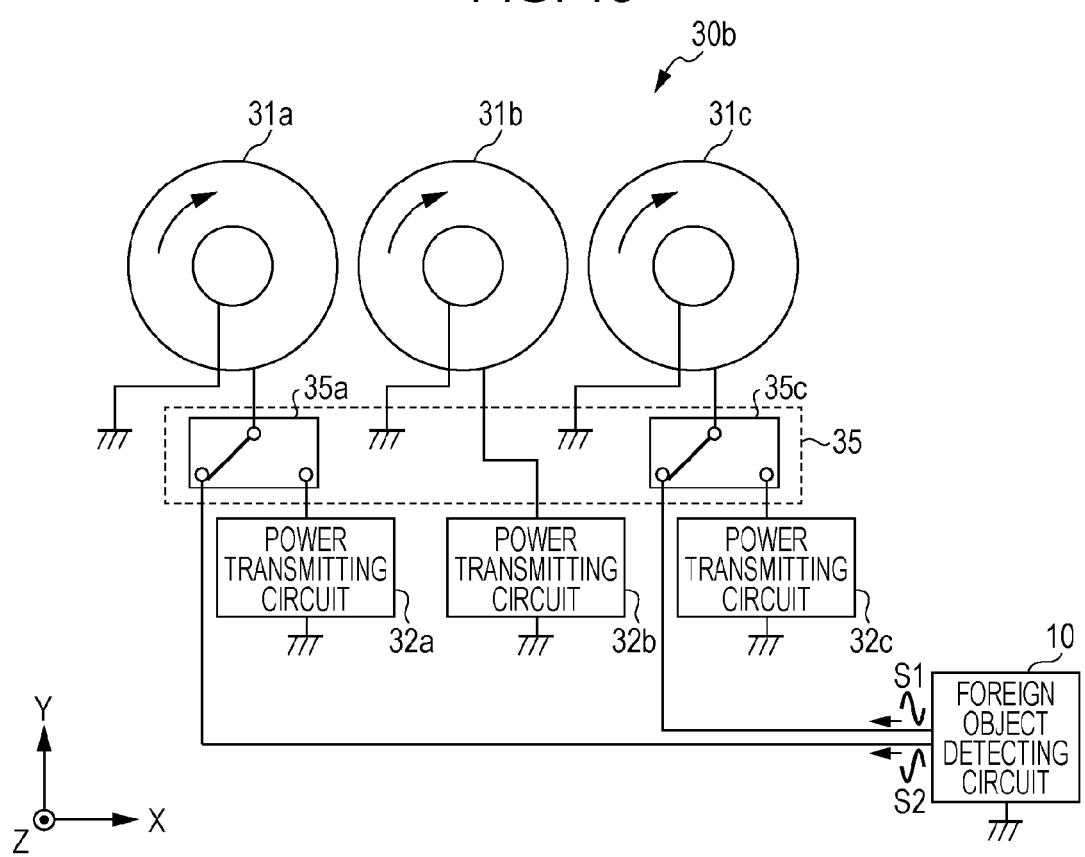
FIG. 15 schematically illustrates part of a power transmitting apparatus shown in FIG. 14.

FIG. 15 schematically illustrates part of the power transmitting apparatus 30*b* shown in FIG. 14. FIG. 15 illustrates the positional relationship between the power transmitting coils 31*a* through 31*c* on the XY plane. For simple representation, in FIG. 15, the components other than the power transmitting coils 31*a* through 31*c*, the power transmitting circuit 32*a* through 32*c*, the switch circuit 35, and the foreign object detecting circuit 10 are not shown. The multiple power transmitting coils 31*a* through 31*c* have windings being wound in the same direction on a single plane, and are disposed adjacent to each other. The foreign object detecting circuit 10 generates detecting signals S1 and S2 each having a predetermined waveform. If the detecting signals S1 and S2 are, for example, sine waves, the foreign object detecting circuit 10 generates the detecting signals S1 and S2 so that there will be a phase difference of, for example, 180 degrees. By setting two detecting signals transmitted from the foreign object detecting circuit 10 to be out of phase with each other by about 180 degrees, a combined magnetic field is formed between the two power transmitting coils 31a and 31c, thereby making it possible to detect foreign objects above the power transmitting coil 31b.

The switch circuit 35 includes switches 35a and 35c. The switch 35a connects the power transmitting coil 31a to the power transmitting circuit 32a or the foreign object detecting circuit 10. When performing detection of foreign objects, the switch 35a connects the power transmitting coil 31a to the foreign object detecting circuit 10. When performing power transmission, the switch 35a connects the power transmitting coil 31a to the power transmitting circuit 32a. Similarly, when performing detection of foreign objects, the switch 35c connects the power transmitting coil 31c to the foreign object detecting circuit 10, and when performing power transmission, the switch 35c connects the power transmitting coil 31c to the power transmitting circuit 32c. With this configuration, the power transmitting coils 31a and 31c can be used for both purposes of power transmission and detection of foreign objects. Accordingly, in the configuration shown in FIGS. 14 and 15, a detecting coil and a power transmitting coil may be constituted by a single component. It is thus possible to reduce the manufacturing cost of the power transmitting apparatus and the wireless power transfer system.

Various modifications described above are also applicable to the configuration in which the power transmitting coils 31a through 31c are used for both purposes of power transmission and detection of foreign objects. For example, the foreign object detecting circuit 10a which generates a single detecting signal may be used, such as in the foreign object detecting devices 100a and 100b shown in FIGS. 3 and 4, in which case, it is also possible that currents flow through the two power transmitting coils 31a and 31c in opposite directions.

Figure 16:
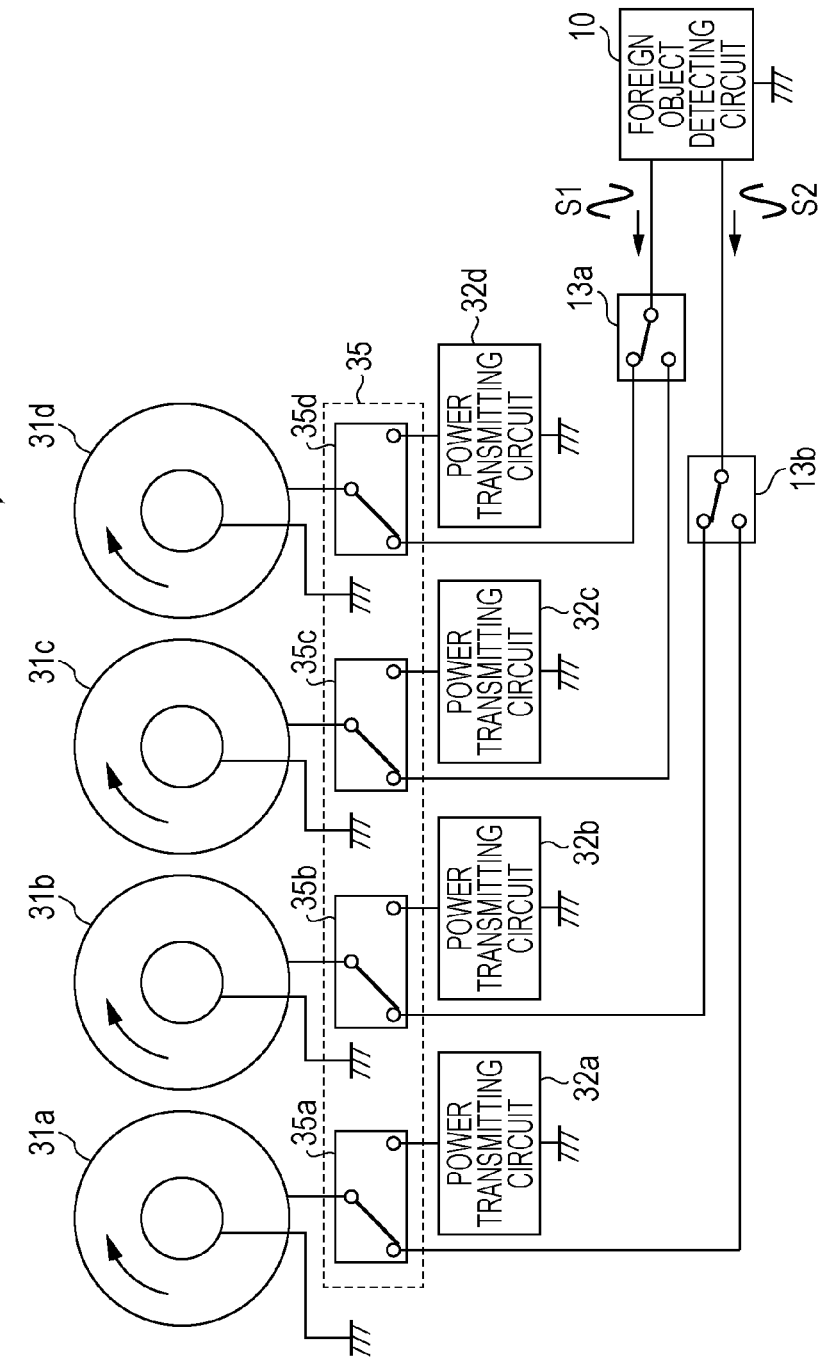
FIG. 16 schematically illustrates part of a power transmitting apparatus of a wireless power transfer system according to a first modified example of the third embodiment.

FIG. 16 schematically illustrates part of a power transmitting apparatus 30c of a wireless power transfer system according to a first modified example of the third embodiment. The power transmitting apparatus 30c includes four power transmitting coils 31a through 31d. The power transmitting coils 31a through 31d have wires being wound in the same direction on a single plane. The power transmitting coils 31a and 31b are connected to a switch 13b, while the power transmitting coils 31c and 31d are connected to a switch 13a. When performing detection of foreign objects, the power transmitting coils 31a and 31c or 31b and 31d are connected to the foreign object detecting circuit 10 via the switches 13a and 13b. The operation for detecting foreign objects is similar to that discussed with reference to FIG. 9. The configuration in which the power transmitting coils 31a through 31d are switched between detection of foreign objects and power transmission is similar to that in FIG. 15. With the configuration shown in FIG. 16, a detecting coil and a power transmitting coil may be constituted by a single component. It is thus possible to reduce the manufacturing cost of the power transmitting apparatus 30c and the wireless power transfer system.

Figure 17:
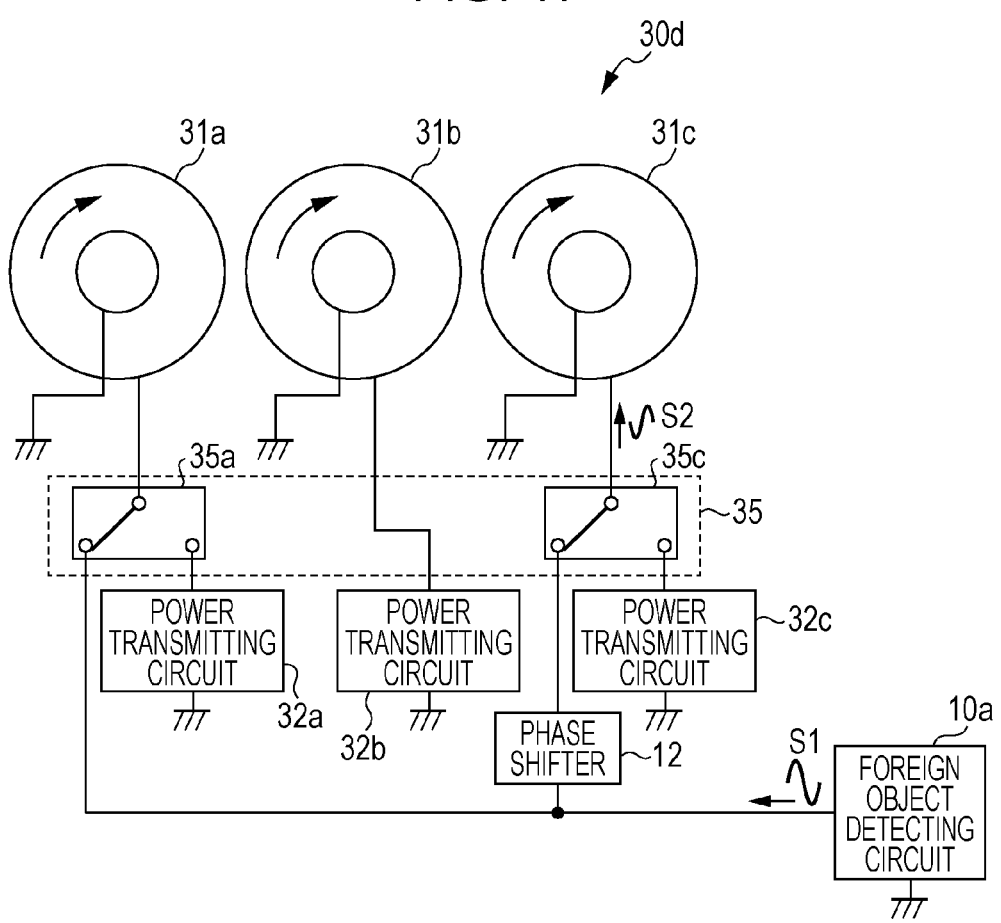
FIG. 17 schematically illustrates part of a power transmitting apparatus of a wireless power transfer system according to a second modified example of the third embodiment.

FIG. 17 schematically illustrates part of a power transmitting apparatus 30d of a wireless power transfer system according to a second modified example of the third embodiment. The configurations of a foreign object detecting circuit 10a and a phase shifter 12 shown in FIG. 17 are similar to those shown in FIG. 3. The power transmitting coils 31a through 31c have windings being wound in the same direction on a single plane. The foreign object detecting circuit 10a generates a single detecting signal S1 and transmits it directly to the power transmitting coil 31a and to the power transmitting coil 31c via the phase shifter 12. More specifically, the phase shifter 12 generates a detecting signal S2 by inverting the polarity of the detecting signal S1 and then transmits the detecting signal S2 to the power transmitting coil 31c. In the power transmitting apparatus 30d shown in FIG. 17, the detecting signal S1 transmitted from the foreign object detecting circuit 10a is caused to diverge in two directions toward the power transmitting coil 31a and the phase shifter 12, and the detecting signal S2 obtained by delaying the phase of the detecting signal S1 by about 180 degrees in the phase shifter 12 is transmitted to the power transmitting coil 31c. Then, currents flow through the two power transmitting coils 31a and 31c in opposite directions. Accordingly, a combined magnetic field is formed between the power transmitting coils 31a and 31c, thereby making it possible to detect a foreign object positioned above the power transmitting coil 31b.

Figure 18:
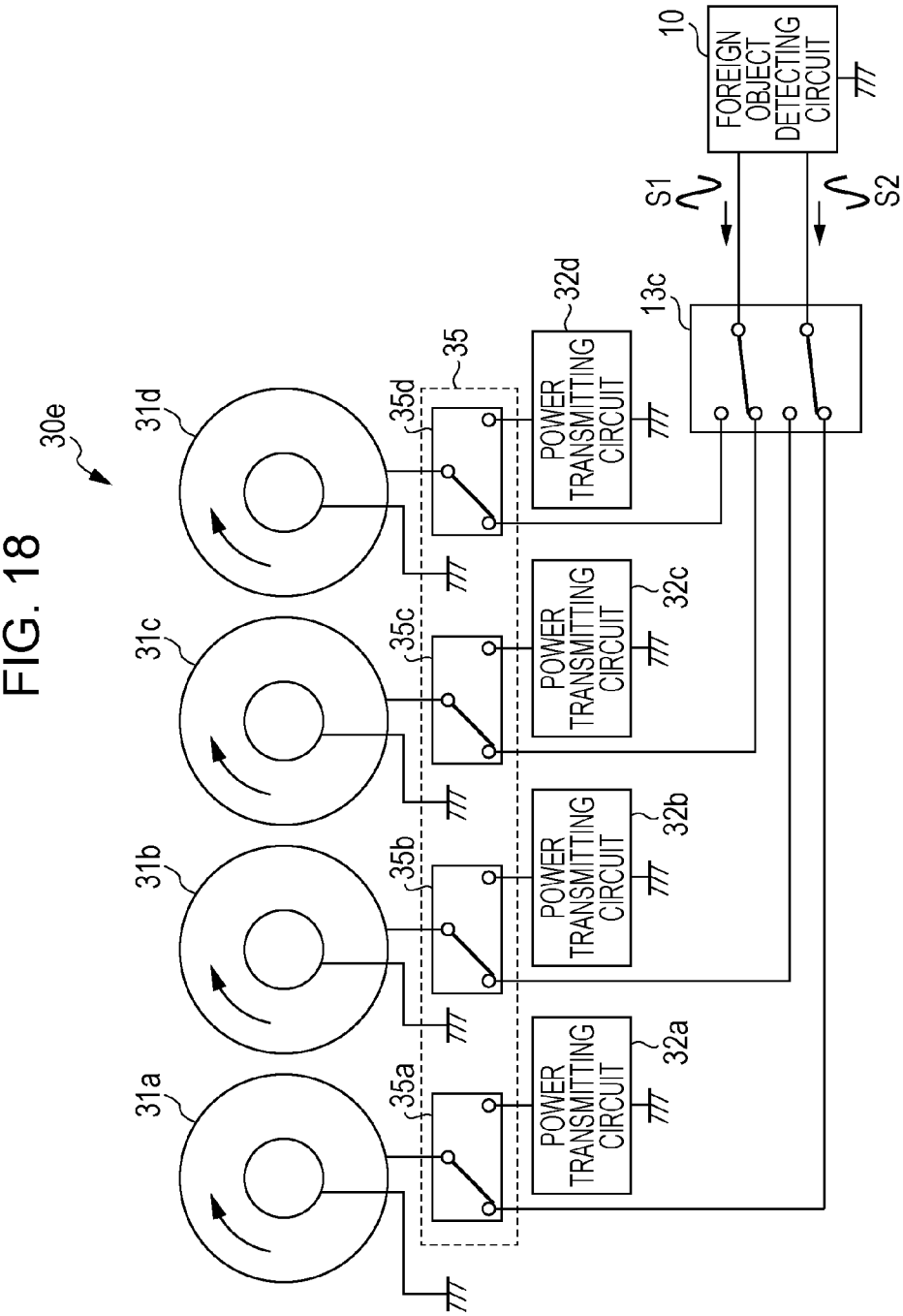
FIG. 18 schematically illustrates part of a power transmitting apparatus of a wireless power transfer system according to a third modified example of the third embodiment.

FIG. 18 schematically illustrates part of a power transmitting apparatus 30e of a wireless power transfer system according to a third modified example of the third embodiment. The configuration of a foreign object detecting circuit 10 shown in FIG. 18 is similar to that shown in FIG. 1. The power transmitting coils 31a through 31d have windings being wound in the same direction on a single plane. The foreign object detecting circuit 10 generates detecting signals S1 and S2 so that there will be a phase difference of, for example, 180 degrees. A switch 13c has the function of connecting two of the power transmitting coils 31a through 31d to the foreign object detecting circuit 10. For example, when detecting a foreign object above the power transmitting coil 31b, the switch 13c connects the power transmitting coils 31a and 31c to the foreign object detecting circuit 10, and when detecting a foreign object above the power transmitting coil 31c, the switch 13c connects the power transmitting coils 31b and 31d to the foreign object detecting circuit 10. Moreover, when detecting a foreign object above and between the power transmitting coils 31a and 31b, the switch 13c connects the power transmitting coils 31a and 31b to the foreign object detecting circuit 10. With this configuration, the foreign object detecting method of the third embodiment and the foreign object detecting method shown in FIG. 7B can be easily combined with a simple structure. By using these two foreign object detecting methods together, it is possible to detect foreign objects over the entire area where heat generation from a foreign object may occur, including a region above and between two adjacent power transmitting coils and a region above the center of each power transmitting coil.

Figure 19:
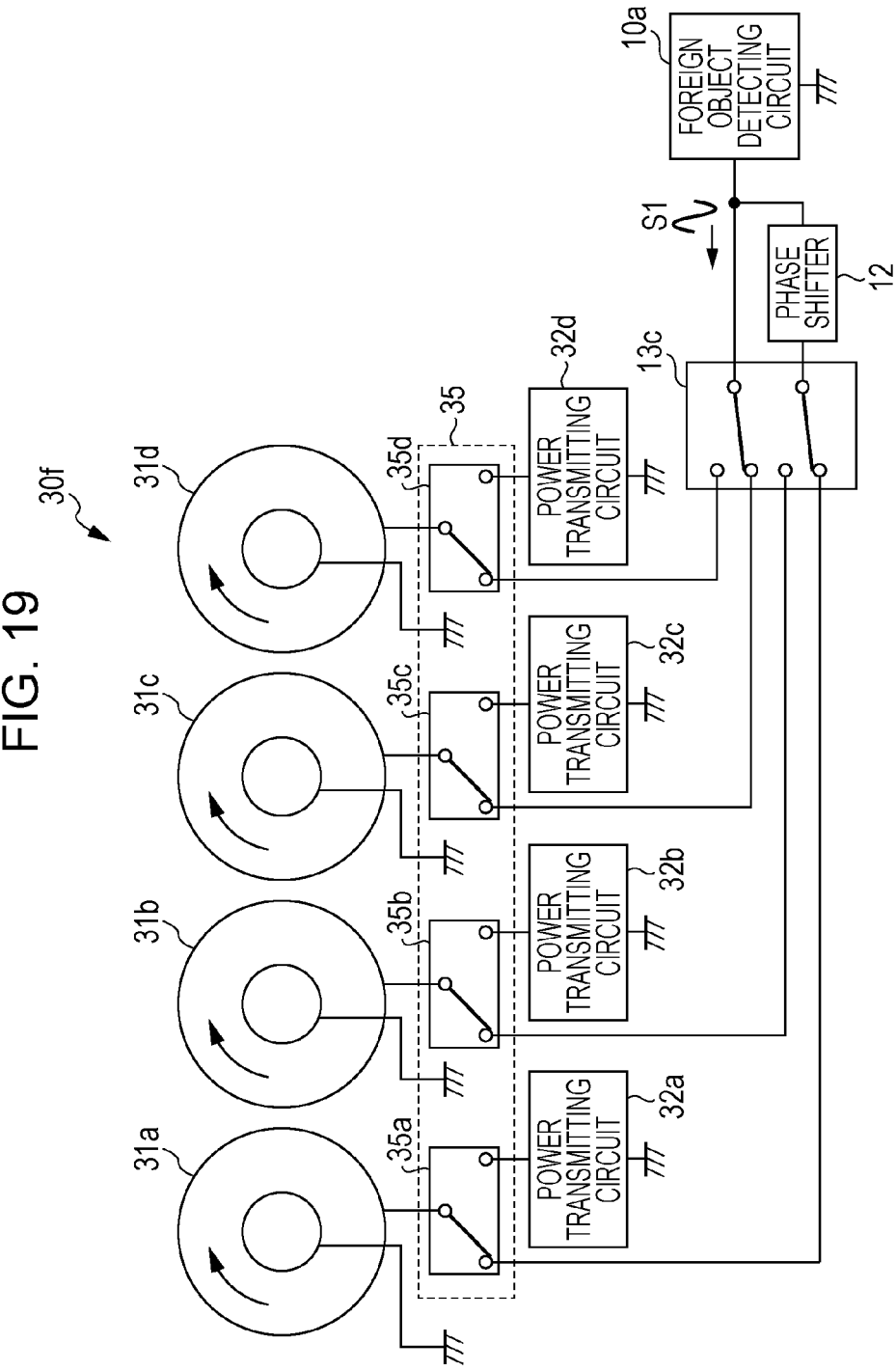
FIG. 19 schematically illustrates part of a power transmitting apparatus of a wireless power transfer system according to a fourth modified example of the third embodiment.

FIG. 19 schematically illustrates part of a power transmitting apparatus 30f of a wireless power transfer system according to a fourth modified example of the third embodiment. The configuration shown in FIG. 19 is the same as that shown in FIG. 18, except that the foreign object detecting circuit 10a outputs a single first detecting signal S1 and the phase shifter 12 is provided. The phase shifter 12 generates a second detecting signal by inverting the polarity of the first detecting signal S1 output from the foreign object detecting circuit 10a and transmits the second detecting signal to the power transmitting coil 31a or 31b via the switch 13c. The first detecting signal S1 is transmitted to the power transmitting coil 31c or 31d from the foreign object detecting circuit 10a. With this configuration, advantages similar to those obtained by the configuration shown in FIG. 18 are also achieved.

In the power transmitting apparatuses 30d and 30f shown in FIGS. 17 and 19, the foreign object detecting circuit 10a outputs only one detecting signal, thereby increasing the simplicity of the configuration of the entire circuitry. Additionally, in the power transmitting apparatuses 30c through 30f shown in FIGS. 16 through 19, respectively, as well as in the power transmitting apparatus 30b shown in FIG. 15, it is possible to use the power transmitting coils 31a through 31d for both purposes of power transmission and detection of foreign objects. Accordingly, a detecting coil and a power transmitting coil may be constituted by a single component. It is thus possible to reduce the manufacturing cost of the power transmitting apparatus and the wireless power transfer system.

If the power transmitting apparatus includes five or more power transmitting coils, by increasing the number of power transmitting coils connected to each switch, two power transmitting coils which are alternately disposed with one power transmitting coil therebetween can be selectively connected to the foreign object detecting circuit. For example, power transmitting coils having wires being wound in a first direction may be switched by using a first switch, while power transmitting coils having wires being wound in a second direction may be switched by using a second switch. Alternatively, the power transmitting apparatus may include three or more switches according to the necessity.

Figure 20:
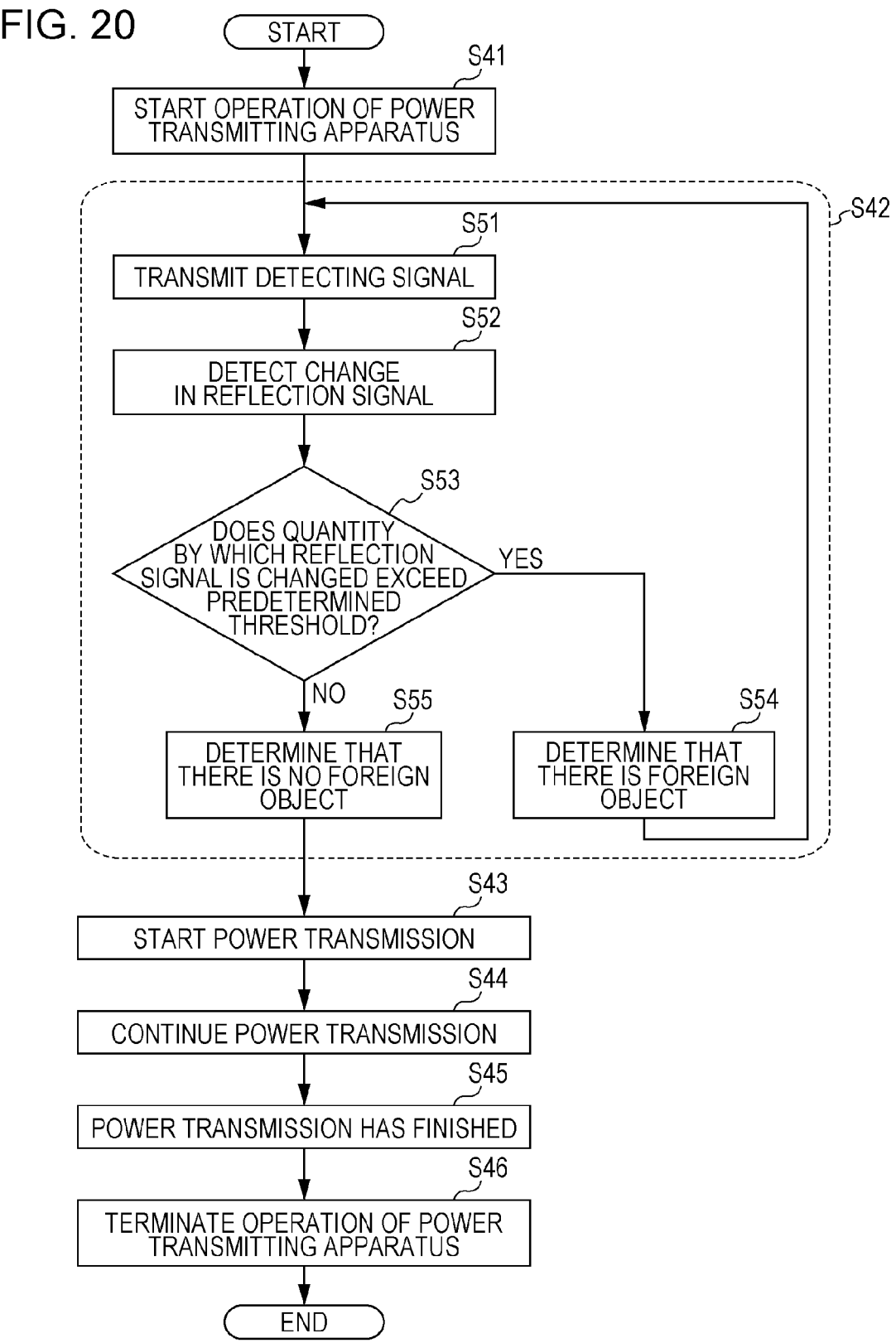
FIG. 20 is a flowchart illustrating an example of the operation of the power transmitting apparatuses according to the second and third embodiments.

In the power transmitting apparatuses according to the second and third embodiments, by detecting foreign objects by using the foreign object detecting device according to an embodiment of the present disclosure, the danger that heat generation from foreign objects will occur can be prevented. An example of the operation of the power transmitting apparatus will be described below with reference to FIG. 20.

First, in step S41, the operation of the power transmitting apparatus is started. Then, foreign object detecting processing is executed in step S42 similarly to the foreign object detecting processing S2 shown in FIG. 5.

The foreign object detecting processing in step S42 will be discussed below in detail. In step S51, the foreign object detecting circuit 10 transmits a detecting signal to two coils. Then, in step S52, the foreign object detecting circuit 10 detects a change in a reflection signal caused by the presence of a foreign object by using the method discussed in the first embodiment. Then, in step S53, the foreign object detecting circuit 10 determines whether or not the amount of change of the reflection signal exceeds a predetermined threshold.

If the result of step S53 is NO, the foreign object detecting circuit 10 determines in step S55 that there is no foreign object. Then, power transmission is started in step S43 and continues in step S44 until power transmission is finished in step S45 and the operation of the power transmitting apparatus is terminated in step S46. If the result of step S53 is YES, the foreign object detecting circuit 10 determines in step S54 that there is a foreign object. In this case, the foreign object detecting circuit 10 repeats steps S51 through S54 until it determines in step S53 that the above-described amount of change does not exceed the predetermined threshold, that is, it determines in step S55 that there is no foreign object. However, if, for example, power supply to the power transmitting apparatus is stopped during power transmission, the operation of the power transmitting apparatus is terminated.

After continuously performing foreign object detecting processing in step S42 until a predetermined time elapses, if a foreign object is still detected, power supply to the power transmitting apparatus may be stopped. Then, a waste of power is avoided.

As described above, by detecting foreign objects before starting power transmission by using a power transmitting apparatus including a foreign object detecting device, it is possible to prevent the danger that heat generation from foreign objects will occur.

In the power transmitting apparatus, foreign object detecting processing may be executed before starting power transmission, and may also be executed while power is being transmitted. In this manner, it is possible to more reliably prevent the danger that heat generation from foreign objects will occur. An example of such an operation will be described below with reference to FIG. 21.

Figure 21:
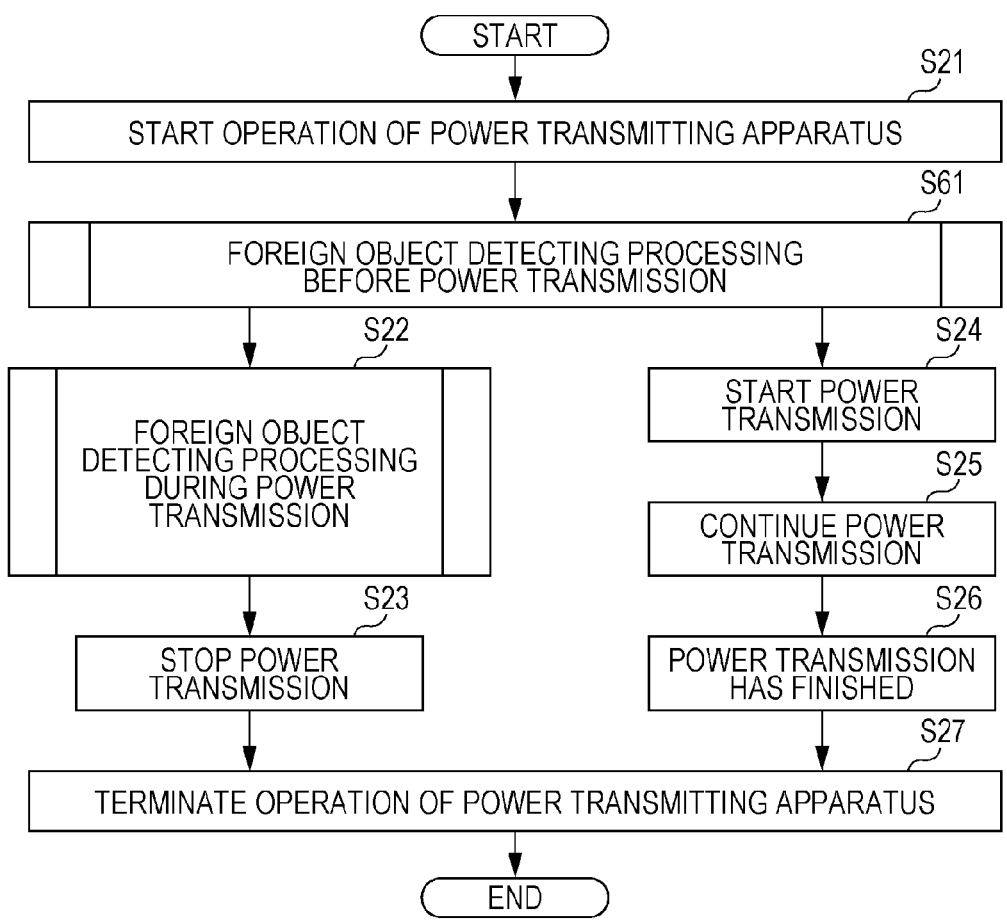
FIG. 21 is a flowchart illustrating an example of the operation of the power transmitting apparatuses according to the second and third embodiments which perform detection of foreign objects before starting power transmission and while power transmission is being performed.

After starting the operation of the power transmitting apparatus in step S21, foreign object detecting processing is executed in step S61 (similar to step S42 of FIG. 20) before starting power transmission. After it is determined that there is no foreign object, power transmission is started in step S24, and at the same time, foreign object detecting processing S22 (similar to step S22 of FIG. 13) is executed while performing power transmission. Steps S21 through S27 in FIG. 21 are respectively similar to steps S21 through S27 in FIG. 13. Step S61 of FIG. 21 is similar to step S42 of FIG. 20. Thus, an explanation of steps S21 through S27 and S61 will be omitted.

In the power transmitting processing shown in FIG. 21, it is possible to detect foreign objects before starting power transmission and also to detect the entry of foreign objects even during power transmission and to stop transmitting power, thereby further enhancing the safety.

Other Modified Examples

In the above-described embodiments, the detecting coils and power transmitting coils are formed in a generally circular or quadrilateral shape. Alternatively, the detecting coils and power transmitting coils may be formed in another shape, for example, a generally square, rectangular, elliptical, or oval shape.

In the second and third embodiments, the power transmitting apparatus 30 or 30b and the power receiving apparatus 40 include the communication circuits 33 and 43, respectively. However, this is only an example. One of the power transmitting apparatus and the power receiving apparatus may include a transmitting circuit, and the other one of the power transmitting apparatus and the power receiving apparatus may include a receiving circuit, in which case, simplex communication may be performed. This simplifies the circuit configuration and therefore reduces the cost. If the level of power to be transmitted and received is fixed, communication is not required, in which case, the provision of communication circuits may be omitted, thereby further reducing the cost.

In the second and third embodiments, in the power transmitting apparatuses 30, 30a, and 30b, the communication circuit 33 is connected to the power transmitting coils 31a through 31c and performs communication by using them. However, this is only an example. The communication circuit 33 may be connected to a separate antenna or another coil. Similarly, in the power receiving apparatus 40, the communication circuit 43 performs communication by using the power receiving coil 41. However, this is only an example. The communication circuit 43 may be connected to a separate antenna or another coil.

In the second and third embodiments, the power transmitting circuits 32a through 32c are connected to the power transmitting coils 31a through 31c, respectively. However, this is only an example. One power transmitting circuit may be connected to all the power transmitting coils 31a through 31c. This makes it possible to reduce the number of power transmitting circuits, which leads to a reduction in the cost. Alternatively, one power transmitting circuit may be selectively connected to one of the power transmitting coils 31a through 31c via a switch. This makes it possible to transmit power only to a power transmitting coil which requires power transmission, thereby reducing a waste of energy and thus improving the power transfer efficiency.

In the second and third embodiments, the area of the magnetic substrate 5 is larger than the region where the detecting coils 11a through 11c and the power transmitting coils 31a through 31c (only the power transmitting coils 31a through 31c in the third embodiment) are placed. With this configuration, it is possible to reduce the influence of, for example, a metal (for example, a top plate of a metallic table) placed under the detecting coils 11a through 11 c and the power transmitting coils 31a through 31c on the detecting coils 11a through 11c and the power transmitting coils 31a through 31c. In the second embodiment shown in FIGS. 11A and 11B, the single large magnetic substrate 5 is used. However, this is only an example. A separate magnetic substrate may be provided for each set of a power transmitting coil and a detecting coil. With this disposition, it is not necessary to provide a magnetic body in areas on which a power transmitting coil and a detecting coil are not disposed and thus to reduce the cost of components.

Other Embodiments

The technology of the present disclosure is not restricted to the above-described embodiments and modified examples, and various other modifications may be made. A description will be given below of other embodiments of a wireless power transmitting apparatus including one of the above-described foreign object detecting devices and a wireless power transfer system including a wireless power transmitting apparatus and a wireless power receiving apparatus.

Figure 22:
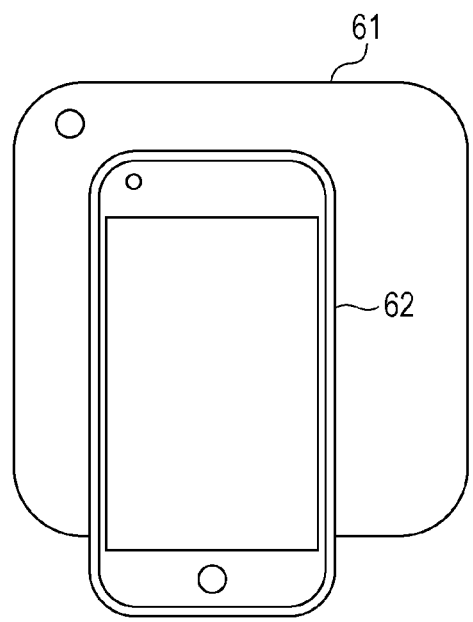
FIG. 22 illustrates a state in which a smartphone including a power receiving apparatus is placed on a power transmitting apparatus.

FIG. 22 illustrates a state in which a smartphone 62 including a power receiving apparatus is placed on a power transmitting apparatus 61. The power transmitting apparatus 61 includes one of the above-described foreign object detecting devices. Before starting power transmission, the foreign object detecting device determines whether or not there is a foreign object on the power transmitting apparatus 61. If it is determined that there is no foreign object, a power transmitting circuit within the power transmitting apparatus 61 wirelessly transmits AC power to the power receiving apparatus within the smartphone 62. The power transmitting apparatus 61 and the power receiving apparatus within the smartphone 62 form a wireless power transfer system.

In this wireless power transfer system, since the foreign object detecting device performs detection of foreign objects before the power transmitting apparatus 61 starts power transmission, it is possible to prevent the danger that heat generation from foreign objects will occur.

If the power transmitting apparatus 61 performs detection of foreign objects by using the foreign object detecting device even during power transmission, it is possible to more reliably prevent the danger that heat generation from foreign objects will occur.

Figure 23:
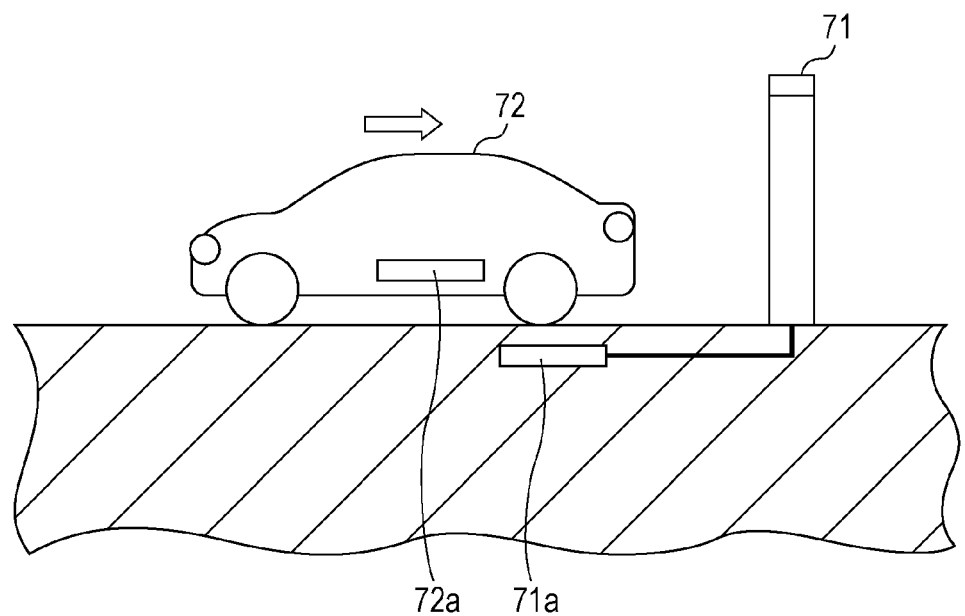
FIG. 23 illustrates a car park equipped with a wireless power transfer system.

FIG. 23 illustrates a car park equipped with a wireless power transfer system. A vehicle 72 includes a power receiving apparatus having a power receiving coil 72a. A power transmitting apparatus 71 is provided in a fence, that is, a car stopper, which is substantially erected on a road. The power transmitting apparatus 71 includes one of the above-described foreign object detecting devices. A power transmitting coil 71a is embedded in the road and is connected to the power transmitting apparatus 71 by using an electric cable.

Before the power transmitting apparatus 71 starts power transmission, the foreign object detecting device determines whether or not there is a foreign object on the power transmitting coil 71a. If it is determined that there is no foreign object on the power transmitting coil 71a and that the position of the power receiving coil 72a within the vehicle 72 is adjusted to that of the power transmitting coil 71a, high-frequency power is transmitted from the power transmitting apparatus 71 to the power transmitting coil 71a via the electric cable, and is further transmitted wirelessly to the power receiving coil 72a.

In this wireless power transfer system, since the foreign object detecting device performs detection of foreign objects before the power transmitting apparatus 71 starts power transmission, it is possible to prevent the danger that heat generation from foreign objects will occur.

If the power transmitting apparatus 71 performs detection of foreign objects by using the foreign object detecting device even during power transmission, it is possible to more reliably prevent the danger that heat generation from foreign objects will occur.

Figure 24:
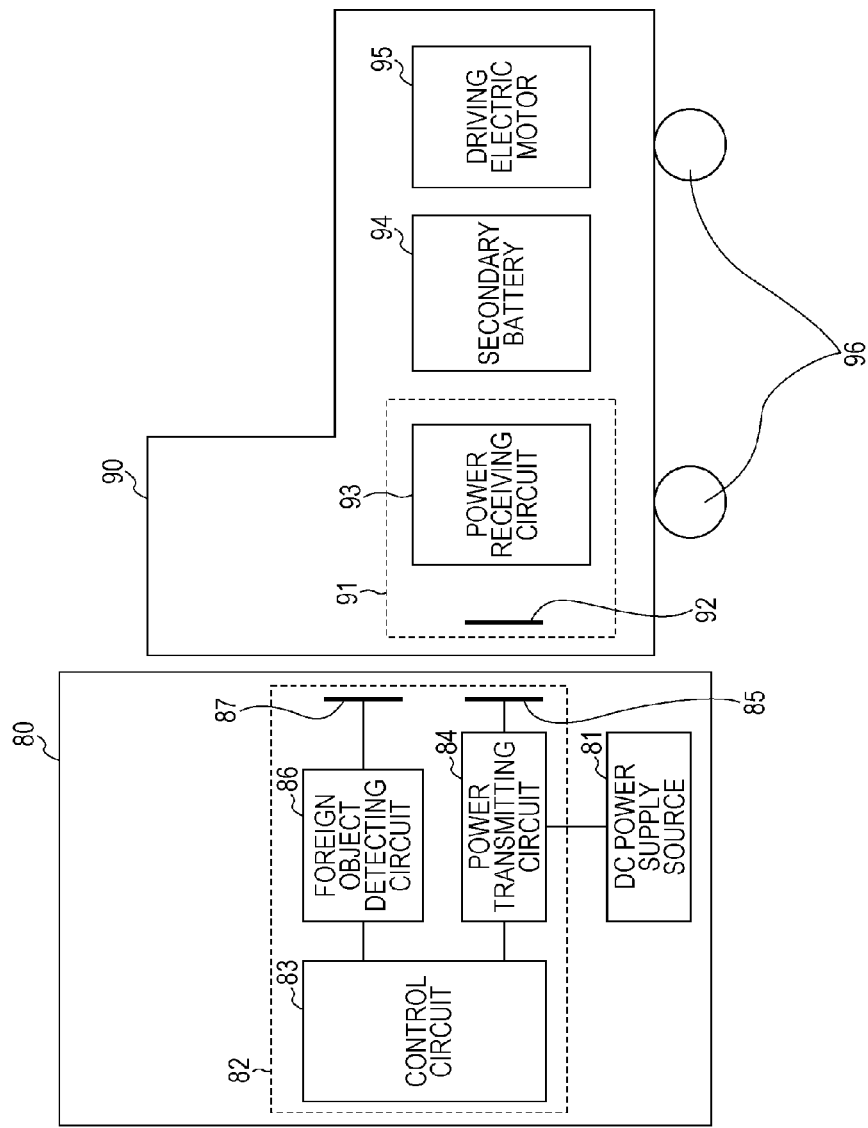
FIG. 24 illustrates an example of the configuration of a wireless power transfer system that transfers power from a wall to a robot in a non-contact manner.

FIG. 24 illustrates an example of the configuration of a wireless power transfer system that transfers power from a wall 80 to a robot 90 used in, for example, a hospital, in a non-contact manner. In this example, a DC power supply source 81 and a power transmitting apparatus 82 are embedded in the wall 80. The power transmitting apparatus 82 includes a control circuit 83, a power transmitting circuit 84, a power transmitting coil 85, a foreign object detecting circuit 86, and a detecting coil 87. The power transmitting apparatus 82 may be configured similarly to the power transmitting apparatus 30 shown in FIG. 10. The robot 90 is equipped with a power receiving apparatus 91 including a power receiving coil 92 and a power receiving circuit 93. The power receiving apparatus 91 may be similarly configured to the power receiving apparatus 40 shown in FIG. 10. The robot 90 also includes a secondary battery 94, a driving electric motor 95, and multiple moving wheels 96.

In this wireless power transfer system, by transferring power from the wall 80 to the robot 90 in, for example, a hospital, in a non-contact manner, the robot 90 can be charged automatically without the need of human aid.

In this wireless power transfer system, since the foreign object detecting device performs detection of foreign objects before the power transmitting apparatus 82 starts power transmission, it is possible to prevent the danger that heat generation from foreign objects will occur.

If the power transmitting apparatus 82 performs detection of foreign objects by using the foreign object detecting device even during power transmission, it is possible to more reliably prevent the danger that heat generation from foreign objects will occur.

While the present disclosure has been described with respect to exemplary embodiments thereof, it will be apparent to those skilled in the art that the disclosure may be modified in numerous ways and may assume many embodiments other than those specifically described above. Accordingly, it is intended by the appended claims to cover all modifications of the disclosure that fall within the true spirit and scope of the disclosure.

The present disclosure encompasses foreign object detecting devices, wireless power transmitting apparatuses, and wireless power transfer systems described in the following items.

[Item 1]

A foreign object detecting device including:

a first coil that includes a first wound wire having first and second terminals;

a second coil that includes a second wound wire having third and fourth terminals and is disposed adjacent to the first coil;

a third coil that includes a third wound wire having fifth and sixth terminals and is disposed adjacent to the second coil, the second coil being disposed between the first coil and the third coil, a winding direction of the third wound wire from the fifth terminal to the sixth terminal being the same as a winding direction of the first wound wire from the first terminal to the second terminal; and a foreign object detecting circuit operative to:

output a first detecting signal having a first predetermined waveform to the first terminal of the first coil and output second detecting signal having a second predetermined waveform to the fifth terminal of the third coil to cause a combined magnetic field extending over the first and third coils, a polarity of the second predetermined waveform being an inverted polarity of the first predetermined waveform;

measure an amount of change of an impedance value with respect to one of the first and third coils corresponding to a change in the combined magnetic field which is caused by presence of a foreign object; and determine that a foreign object above the second coil is present if the amount of change exceeds a predetermined value.

Potential of each of the second, fourth, and sixth terminals is at the same as reference potential of the foreign object detecting circuit.

According to the above-described aspect, the foreign object detecting device includes the first, second, and third coils, and the foreign object detecting circuit. The first coil is constituted by a first wound wire having first and second terminals. The second coil is constituted by a second wound wire having third and fourth terminals and is disposed adjacent to the first coil. The third coil is constituted by a third wound wire having fifth and sixth terminals and is disposed adjacent to the second coil on a side opposite a side to which the first coil is adjacent. The winding direction of the third wound wire from the fifth terminal to the sixth terminal is the same as the winding direction of the first wound wire from the first terminal to the second terminal. The foreign object detecting circuit outputs a first detecting signal having a first predetermined waveform to the first terminal of the first coil and also outputs a second detecting signal having a second predetermined waveform to the fifth terminal of the third coil to generate a combined magnetic field extending over the first and third coils. The polarity of the second predetermined waveform is an inverted state of the polarity of the first predetermined waveform.

With this configuration, among three adjacent detecting coils, magnetic fields generated between the two outer detecting coils which sandwich the center detecting coil therebetween are coupled with each other. Accordingly, a magnetic field generated at a position separated from the center detecting coil can be intensified.

The foreign object detecting circuit measures the amount of change of the impedance value of one of the first and third coils with respect to a change in the combined magnetic field in the case of the presence of a foreign object. If this amount of change exceeds a predetermined value, the foreign object detecting circuit determines that there is a foreign object above the second coil.

With this configuration, not only the range in which foreign objects can be detected is increased by disposing multiple coils, but also a foreign object above a center detecting coil can be detected with high precision by intensifying the magnetic field above the center detecting coil.

As a result, it is possible to increase the range (in particular, the range in the height direction) in which foreign objects can be detected with high precision.

Additionally, general-purpose detecting coils may be safely used, thereby suppressing an increase in the number of components, dimensions, and manufacturing cost of the foreign object detecting device.

[Item 2]

The foreign object detecting device according to item 1, wherein:

each of the first, third, and fifth terminals is one of an outer terminal disposed on an outer side of a corresponding one of the first, second, and third coils and an inner terminal disposed on an inner side of a corresponding one of the first, second, and third coils; and each of the second, fourth, and sixth terminals is the other one of the outer terminal and the inner terminal of a corresponding one of the first, second, and third coils.

[Item 3]

The foreign object detecting device according to item 1 or 2, wherein a winding direction of the second wound wire of the second coil from the third terminal to the fourth terminal is the same as the winding direction of the first wound wire of the first coil from the first terminal to the second terminal.

[Item 4]

The foreign object detecting device according to item 1, wherein the foreign object detecting circuit measures an amount of change of an impedance value of the first and third coils connected with each other with respect to a change in the combined magnetic field in the case of the presence of a foreign object, and determines that a foreign object is present above the second coil if the amount of change exceeds a predetermined value.

According to the above-described aspect, by reading two reflection signals at a portion between terminals of the foreign object detecting circuit from which the first and second detecting signals are output, the complex impedance value of the first and third coils is measured on the basis of the difference between the first and second detecting signals. Since the waveform of the second detecting signal is an inverted shape of that of the first detecting signal, the reflection signals can be read at a portion between the terminals by taking the difference between the first and second detecting signals, thereby enhancing the sensitivity. The reason why the sensitivity is enhanced is that the amplitude about twice as high as that of each of the first and second detecting signals is obtained. Additionally, only one measurement circuit is required for measuring the impedance, amplitude, and frequency.

[Item 5]

The foreign object detecting device according to one of items 1 to 4, wherein each of the first, second, and third coils is disposed in a direction perpendicular to an axis of a corresponding one of the first, second, and third coils.

According to the above-described aspect, since the first through third coils are aligned in a direction perpendicular to their axes, the distributions of magnetic fields generated from the first and third coils become uniform, thereby making it possible to detect foreign objects with high precision.

[Item 6]

The foreign object detecting device according to one of items 1 to 5, wherein the first and second detecting signals are alternating current signals or pulse signals.

The use of AC signals as the first and second detecting signals is suitable in a situation where the entry of foreign objects is relatively frequent and/or the foreign object detecting device is used for long hours. Power of an AC signal gradually changes. Thus, if the foreign object detecting device is used continuously for long hours, it is possible to reduce the burden on the first and third coils. On the other hand, the use of pulse signals as the first and second detecting signals is suitable in a situation where the entry of foreign objects is relatively less frequent. By the use of a pulse signal, an intermittent signal is likely to be produced, thereby making it possible to perform detection of foreign objects while power consumption is being reduced.

[Item 7]

The foreign object detecting device according to one of items 1 to 6, wherein the foreign object detecting circuit simultaneously outputs the first and second detecting signals to the first and third coils, respectively.

According to the above-described aspect, since there is no phase difference between the first and second detecting signals, the distributions of magnetic fields generated from the first and third coils become uniform, thereby making it possible to detect foreign objects with high precision.

[Item 8]

The foreign object detecting device according to one of items 1 to 7, further including:

four or more coils including the first, second, and third coils and one or more coils having the same structure as a structure of the first and third coils; and at least one switch that electrically connects the first and third coils among the four or more coils to the foreign object detecting circuit, wherein, before outputting the first and second detecting signals, the foreign object detecting circuit selects the first and third coils among the four or more coils by using the at least one switch, as two coils disposed adjacent to both sides of one coil.

According to the above-described aspect, four or more coils are disposed, and a combination of two coils disposed adjacent to both sides of one coil may be selected as desired from among the four or more coils, thereby further increasing the range in which foreign objects can be detected.

[Item 9]

A wireless power transmitting apparatus including:

the foreign object detecting device according to one of items 1 to 8;

a power transmitting coil; and a power transmitting circuit that transmits high-frequency power to the power transmitting coil.

According to the above-described aspect, the wireless power transmitting apparatus includes the foreign object detecting device according to an embodiment of the present disclosure that is able to increase the range in which foreign objects can be detected with high precision. It is thus possible to increase the range in which the power transmitting circuit is able to transmit high-frequency power.

Additionally, if the first and third coils and the power transmitting coil are different coils, the detection of the entry of foreign objects can be performed even while high-frequency power is being transmitted. It is thus possible to prevent the danger that heat generation will occur due to the presence of foreign objects.

[Item 10]

The wireless power transmitting apparatus according to item 9, further including:

a housing within which the power transmitting coil is disposed, wherein an outer periphery of each of the first and third coils is smaller than an outer periphery of the power transmitting coil, and the first and third coils are disposed between a main surface of the housing and the power transmitting coil.

According to the above-described aspect, since the outer periphery of each of the first and third coils is smaller than that of the power transmitting coil, it is possible to detect foreign objects smaller than the power transmitting coil.

[Item 11]

The wireless power transmitting apparatus according to item 9, wherein the power transmitting coil and at least one of the first and third coils are the same component.

According to the above-described aspect, it is possible to reduce the cost and also to decrease the weight and the thickness of the wireless power transmitting apparatus.

[Item 12]

The wireless power transmitting apparatus according to one of items 9 to 11, wherein power of the first detecting signal and power of the second detecting signal are lower than the high-frequency power.

[Item 13]

The wireless power transmitting apparatus according to one of items 9 to 12, further including:

a control circuit that causes the power transmitting circuit to transmit the high-frequency power after it is determined by the foreign object detecting circuit that there is no foreign object within a magnetic field formed by the first and third coils.

According to the above-described aspect, after it is determined by the foreign object detecting circuit that there is no foreign object within a magnetic field formed by the first and third coils, the power transmitting circuit is caused to transmit high-frequency power, thereby enhancing the safety.

[Item 14]

The wireless power transmitting apparatus according to one of items 9 to 13, wherein the second coil and the power transmitting coil are the same component.

[Item 15]

A wireless power transfer system including:

the wireless power transmitting apparatus according to one of items 9 to 14; and a wireless power receiving apparatus.

[Item 16]

A foreign object detecting device including:

a first coil that includes a first wound wire having first and second terminals;

a second coil that includes a second wound wire having third and fourth terminals and is disposed adjacent to the first coil;

a third coil that includes a third wound wire having fifth and sixth terminals and is disposed adjacent to the second coil, the second coil being disposed between the first coil and the third coil, a winding direction of the third wound wire from the fifth terminal to the sixth terminal being the same as a winding direction of the first wound wire from the first terminal to the second terminal;

a foreign object detecting circuit that outputs a first detecting signal having a first predetermined waveform; and a phase shifter that converts the first detecting signal into a second detecting signal having a second predetermined waveform and outputs the second detecting signal to the fifth terminal of the third coil, a polarity of the second predetermined waveform being an inverted polarity of the first predetermined waveform, the foreign object detecting circuit operative to:

output the first detecting signal to the first terminal of the first coil and to the phase shifter to cause a combined magnetic field extending over the first and third coils;

measure an amount of change of a combined impedance value of the first and third coils with respect to a change in the combined magnetic field in the case of the presence of a foreign object;

determine that a foreign object above the second coil is present if the amount of change exceeds a predetermined value, where potential of each of the second, fourth, and sixth terminals is at the same as reference potential of the foreign object detecting circuit.

According to the above-described aspect, the foreign object detecting device includes a first coil that is constituted by a first wound wire having first and second terminals, a second coil that is constituted by a second wound wire having third and fourth terminals and is disposed adjacent to the first coil, a third coil that is constituted by a third wound wire having fifth and sixth terminals and is disposed adjacent to the second coil on a side opposite a side to which the first coil is adjacent, a winding direction of the third wound wire from the fifth terminal to the sixth terminal being the same as a winding direction of the first wound wire from the first terminal to the second terminal, a foreign object detecting circuit, and a phase shifter.

The foreign object detecting circuit outputs a first detecting signal having a first predetermined waveform. The phase shifter converts the first detecting signal into a second detecting signal having a second predetermined waveform and outputs the second detecting signal to the fifth terminal of the third coil. The polarity of the second predetermined waveform is an inverted state of the polarity of the first predetermined waveform. The foreign object detecting circuit outputs the first detecting signal to the first terminal of the first coil and to the phase shifter to generate a combined magnetic field extending over the first and third coils.

The foreign object detecting circuit measures an amount of change of a complex impedance value of the first and third coils with respect to a change in the combined magnetic field in the case of the presence of a foreign object, and determines that there is a foreign object above the second coil if the amount of change exceeds a predetermined value.

According to the above-described aspect, by the provision of the phase shifter, the foreign object detecting circuit is able to generate the second detecting signal merely by outputting the single first detecting signal. This eliminates the need to provide a circuit for generating the second detecting signal in the foreign object detecting circuit.

[Item 17]

The foreign object detecting device according to item 16, wherein:

each of the first, third, and fifth terminals is one of an outer terminal disposed on an outer side of a corresponding one of the first, second, and third coils and an inner terminal disposed on an inner side of a corresponding one of the first, second, and third coils; and each of the second, fourth, and sixth terminals is the other one of the outer terminal and the inner terminal of a corresponding one of the first, second, and third coils.

[Item 18]

The foreign object detecting device according to item 16 or 17, wherein a winding direction of the second wound wire of the second coil from the third terminal to the fourth terminal is the same as the winding direction of the first wound wire of the first coil from the first terminal to the second terminal.

[Item 19]

The foreign object detecting device according to one of items 16 to 18, wherein each of the first, second, and third coils is disposed in a direction perpendicular to an axis of a corresponding one of the first, second, and third coils.

According to the above-described aspect, since the first through third coils are aligned in a direction perpendicular to their axes, the distributions of magnetic fields generated from the first and third coils become uniform, thereby making it possible to detect foreign objects with high precision.

[Item 20]

The foreign object detecting device according to one of items 16 to 19, wherein the first and second detecting signals are alternating current signals or pulse signals.

The use of AC signals as the first and second detecting signals is suitable in a situation where the entry of foreign objects is relatively frequent and/or the foreign object detecting device is used for long hours. Power of an AC signal gradually changes. Thus, if the foreign object detecting device is used continuously for long hours, it is possible to reduce the burden on the first and third coils. On the other hand, the use of pulse signals as the first and second detecting signals is suitable in a situation where the entry of foreign objects is relatively less frequent. By the use of a pulse signal, an intermittent signal is likely to be produced, thereby making it possible to perform detection of foreign objects while power consumption is being reduced.

[Item 21]

A wireless power transmitting apparatus including:

the foreign object detecting device according to one of items 16 to 20;

a power transmitting coil; and a power transmitting circuit that transmits high-frequency power to the power transmitting coil.

According to the above-described aspect, the wireless power transmitting apparatus includes the foreign object detecting device according to an embodiment of the present disclosure that is able to increase the range in which foreign objects can be detected with high precision. It is thus possible to increase the range in which the power transmitting circuit is able to transmit high-frequency power.

Additionally, if the first and third coils and the power transmitting coil are different coils, the detection of the entry of foreign objects can be performed even while high-frequency power is being transmitted. It is thus possible to prevent the danger that heat generation will occur due to the presence of foreign objects.

[Item 22]

The wireless power transmitting apparatus according to item 21, further including:

a housing within which the power transmitting coil is disposed, wherein an outer periphery of each of the first and third coils is smaller than an outer periphery of the power transmitting coil, and the first and third coils are disposed between a main surface of the housing and the power transmitting coil.

According to the above-described aspect, since the outer periphery of each of the first and third coils is smaller than that of the power transmitting coil, it is possible to detect foreign objects smaller than the power transmitting coil.

[Item 23]
The wireless power transmitting apparatus according to item 21, wherein the power transmitting coil and at least one of the first and third coils are the same component.

According to the above-described aspect, it is possible to reduce the cost and also to decrease the weight and the thickness of the wireless power transmitting apparatus.

[Item 24]
The wireless power transmitting apparatus according to one of items 21 to 23, wherein power of the first detecting signal and power of the second detecting signal are lower than the high-frequency power.

[Item 25]
The wireless power transmitting apparatus according to one of items 21 to 24, further including:
a control circuit that causes the power transmitting circuit to transmit the high-frequency power after it is determined by the foreign object detecting circuit that there is no foreign object within a magnetic field formed by the first and third coils.

According to the above-described aspect, after it is determined by the foreign object detecting circuit that there is no foreign object within a magnetic field formed by the first and third coils, the power transmitting circuit is caused to transmit high-frequency power, thereby enhancing the safety.

[Item 26]
The wireless power transmitting apparatus according to one of items 21 to 25, wherein the second coil and the power transmitting coil are the same component.

[Item 27]
A wireless power transfer system including:
the wireless power transmitting apparatus according to one of items 21 to 26; and
a wireless power receiving apparatus.

[Item 28]
A foreign object detecting device including:
a first coil on which a wire is wound;
a second coil on which a wire is wound and that is disposed adjacent to the first coil;
a third coil on which a wire is wound and that is disposed adjacent to the second coil the second coil being disposed between the first coil and the third coil; and
a foreign object detecting circuit operative to:
output a first detecting signal having a first predetermined waveform to the first coil and output a second detecting signal having a second predetermined waveform to the third coil, that causes one of a current based on the first detecting signal flowing through the first coil and a current based on the second detecting signal flowing through the third coil to flow clockwise and causes the other one of the current based on the first detecting signal and the current based on the second detecting signal to flow counterclockwise to cause a combined magnetic field extending over the first and third coils;
measure an amount of change of a complex impedance value of the first and third coils with respect to a change in the combined magnetic field in the case of the presence of a foreign object;
determine that a foreign object above the second coil is present if the amount of change exceeds a predetermined value to A foreign object detecting device, a wireless power transmitting apparatus, and a wireless power transfer system according to an embodiment of the present disclosure are suitably used for detecting foreign objects near a power transmitting coil or a power receiving coil when wirelessly transmitting power to a power receiving apparatus, such as a mobile device and an electric vehicle (EV).

What is claimed is:
1. A foreign object detecting device, comprising:
a first coil that includes a first wound wire having first and second terminals;
a second coil that includes a second wound wire having third and fourth terminals and is disposed adjacent to the first coil;
a third coil that includes a third wound wire having fifth and sixth terminals and is disposed adjacent to the second coil, the second coil being disposed between the first coil and the third coil, a winding direction of the third wound wire from the fifth terminal to the sixth terminal being the same as a winding direction of the first wound wire from the first terminal to the second terminal; and
a foreign object detecting circuit operative to
output a first detecting signal having a first predetermined waveform to the first terminal of the first coil, and output second detecting signal having a second predetermined waveform to the fifth terminal of the third coil, to cause a combined magnetic field extending over the first and third coils, a polarity of the second predetermined waveform being an inverted polarity of the first predetermined waveform;
measure an amount of change of an impedance value with respect to one of the first and third coils corresponding to a change in the combined magnetic field, which is caused by presence of the foreign object; and
determine that the foreign object above the second coil is present if the amount of change exceeds a predetermined value,
wherein a potential of each of the second, fourth, and sixth terminals is at the same as a reference potential of the foreign object detecting circuit.

2. The foreign object detecting device according to claim 1,
wherein each of the first, third, and fifth terminals is one of an outer terminal disposed on an outer side of a corresponding one of the first, second, and third coils, and an inner terminal disposed on an inner side of a corresponding one of the first, second, and third coils; and
each of the second, fourth, and sixth terminals is the other one of the outer terminal and the inner terminal of a corresponding one of the first, second, and third coils.

3. The foreign object detecting device according to claim 1,
wherein a winding direction of the second wound wire of the second coil from the third terminal to the fourth terminal is the same as the winding direction of the first wound wire of the first coil from the first terminal to the second terminal.

4. The foreign object detecting device according to claim 1,
wherein the foreign object detecting circuit measures the amount of change of the impedance value of the first and third coils connected with each other with respect to the change in the combined magnetic field in the case of the presence of the foreign object, and determines that the foreign object is present above the second coil if the amount of the change exceeds the predetermined value.

5. The foreign object detecting device according to claim 1,
  wherein each of the first, second, and third coils is disposed in a direction perpendicular to an axis of a corresponding one of the first, second, and third coils.

6. The foreign object detecting device according to claim 1,
  wherein the first and second detecting signals are alternating current signals or pulse signals.

7. The foreign object detecting device according to claim 1,
  wherein the foreign object detecting circuit simultaneously outputs the first and second detecting signals to the first and third coils, respectively.

8. The foreign object detecting device according to claim 1, further comprising:
  four or more coils including the first, second, and third coils and one or more coils having the same structure as a structure of the first and third coils; and
  at least one switch that electrically connects the first and third coils among the four or more coils to the foreign object detecting circuit,
  wherein, before outputting the first and second detecting signals, the foreign object detecting circuit selects the first and third coils among the four or more coils by using the at least one switch, as two coils disposed adjacent to both sides of one coil.

9. A wireless power transmitting apparatus, comprising:
  the foreign object detecting device according to claim 1;
  a power transmitting coil; and
  a power transmitting circuit that transmits high-frequency power to the power transmitting coil.

10. The wireless power transmitting apparatus according to claim 9, further comprising:
  a housing within which the power transmitting coil is disposed,
  wherein an outer periphery of each of the first and third coils is smaller than an outer periphery of the power transmitting coil, and
  the first and third coils are disposed between a main surface of the housing and the power transmitting coil.

11. The wireless power transmitting apparatus according to claim 9,
  wherein the power transmitting coil and at least one of the first and third coils are the same component.

12. The wireless power transmitting apparatus according to claim 9,
  wherein power of the first detecting signal and power of the second detecting signal are lower than the high-frequency power.

13. The wireless power transmitting apparatus according to claim 9, further comprising:
  a control circuit that causes the power transmitting circuit to transmit the high-frequency power after it is determined by the foreign object detecting circuit that there is no foreign object within a magnetic field formed by the first and third coils.

14. The wireless power transmitting apparatus according to claim 9,
  wherein the second coil and the power transmitting coil are the same component.

15. A wireless power transfer system, comprising:
  the wireless power transmitting apparatus according to claim 9; and
  a wireless power receiving apparatus.

16. A foreign object detecting device, comprising:
  a first coil that includes a first wound wire having first and second terminals;
  a second coil that includes a second wound wire having third and fourth terminals and is disposed adjacent to the first coil;
  a third coil that includes a third wound wire having fifth and sixth terminals and is disposed adjacent to the second coil, the second coil being disposed between the first coil and the third coil, a winding direction of the third wound wire from the fifth terminal to the sixth terminal being the same as a winding direction of the first wound wire from the first terminal to the second terminal;
  a foreign object detecting circuit that outputs a first detecting signal having a first predetermined waveform; and
  a phase shifter that converts the first detecting signal into a second detecting signal having a second predetermined waveform, and outputs the second detecting signal to the fifth terminal of the third coil, a polarity of the second predetermined waveform being an inverted polarity of the first predetermined waveform,
  wherein the foreign object detecting circuit is operative to
    output the first detecting signal to the first terminal of the first coil and to the phase shifter to cause a combined magnetic field extending over the first and third coils,
    measure an amount of change of a combined impedance value of the first and third coils with respect to a change in the combined magnetic field in a case of the presence of the foreign object, and
    determine that the foreign object above the second coil is present if the amount of change exceeds a predetermined value, and
  wherein a potential of each of the second, fourth, and sixth terminals is at the same as a reference potential of the foreign object detecting circuit.

17. The foreign object detecting device according to claim 16,
  wherein each of the first, third, and fifth terminals is one of an outer terminal disposed on an outer side of a corresponding one of the first, second, and third coils and an inner terminal disposed on an inner side of a corresponding one of the first, second, and third coils; and
  each of the second, fourth, and sixth terminals is an other one of the outer terminal and the inner terminal of a corresponding one of the first, second, and third coils.

18. The foreign object detecting device according to claim 16,
  wherein a winding direction of the second wound wire of the second coil from the third terminal to the fourth terminal is the same as the winding direction of the first wound wire of the first coil from the first terminal to the second terminal.

19. The foreign object detecting device according to claim 16,
  wherein each of the first, second, and third coils is disposed in a direction perpendicular to an axis of a corresponding one of the first, second, and third coils.

20. A foreign object detecting device, comprising:
  a first coil on which a wire is wound;
  a second coil on which a wire is wound and that is disposed adjacent to the first coil;
  a third coil on which a wire is wound and that is disposed adjacent to the second coil, the second coil being disposed between the first coil and the third coil; and a foreign object detecting circuit operative to
output a first detecting signal having a first predetermined waveform to the first coil, and output a second detecting signal having a second predetermined waveform to the third coil, that causes one of a current based on the first detecting signal flowing through the first coil and a current based on the second detecting signal flowing through the third coil to flow clockwise, and causes an other one of the current based on the first detecting signal and the current based on the second detecting signal to flow counterclockwise to cause a combined magnetic field extending over the first and third coils;
measure an amount of change of a complex impedance value of the first and third coils with respect to a change in the combined magnetic field in the case of the presence of the foreign object; and
determine that the foreign object above the second coil is present if the amount of change exceeds a predetermined value.

\* \* \* \* \*